US011573527B2

(12) United States Patent
Kagotani

(10) Patent No.: US 11,573,527 B2
(45) Date of Patent: Feb. 7, 2023

(54) CALCULATION METHOD, RECORDING METHOD, OPTICAL FILM, AND PHASE MODULATION STRUCTURE

(71) Applicant: TOPPAN PRINTING CO., LTD., Tokyo (JP)

(72) Inventor: Akihito Kagotani, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 908 days.

(21) Appl. No.: 16/442,181

(22) Filed: Jun. 14, 2019

(65) Prior Publication Data

US 2019/0293492 A1   Sep. 26, 2019

Related U.S. Application Data

(63) Continuation of application No. PCT/JP2017/045178, filed on Dec. 15, 2017.

(30) Foreign Application Priority Data

Dec. 15, 2016 (JP) .............................. JP2016-243433

(51) Int. Cl.
*G03H 1/08* (2006.01)
*B42D 25/328* (2014.01)
(Continued)

(52) U.S. Cl.
CPC ......... *G03H 1/0808* (2013.01); *B42D 25/328* (2014.10); *G01J 9/0246* (2013.01);
(Continued)

(58) Field of Classification Search
CPC ...... G03H 1/0808; G03H 1/0011; G03H 1/08; G03H 1/0891; G03H 1/0244;
(Continued)

(56) References Cited

U.S. PATENT DOCUMENTS

2002/0027702 A1   3/2002  Kitamura et al.
2008/0198428 A1*  8/2008  Kitamura ................. G03H 1/08
                                                          359/9
(Continued)

FOREIGN PATENT DOCUMENTS

JP   H09-319290 A   12/1997
JP   H10-123919 A    5/1998
(Continued)

OTHER PUBLICATIONS

Office Action dated Aug. 10, 2021 issued in a corresponding Japanese Patent Application No. 2018-556763, (10 pages).
(Continued)

*Primary Examiner* — Jade R Chwasz
(74) *Attorney, Agent, or Firm* — Foley & Lardner LLP

(57) ABSTRACT

A phase modulation structure includes a recording surface including phase angle recording regions in a plurality of calculated element regions corresponding to reconstruction points of an image on a one-to-one basis, each phase angle recording region being formed of a plurality of unit blocks in each of which a phase angle is recorded, the phase angle being calculated based on a phase that is a sum of a plurality of phases of light from the corresponding reconstruction points; and a representative area that is one of divisions of the calculated element region, the representative area being obtained by radially dividing the calculated element region centered on a point on the calculated element region, the point being obtained by extending a normal line from the corresponding reconstruction point to the calculated element region on the recording surface.

11 Claims, 16 Drawing Sheets

(51) Int. Cl.
*G01J 9/02* (2006.01)
*G03H 1/00* (2006.01)
*G03H 1/02* (2006.01)

(52) U.S. Cl.
CPC .............. *G03H 1/0011* (2013.01); *G03H 1/08* (2013.01); *G03H 1/0891* (2013.01); *G01J 2009/0203* (2013.01); *G01J 2009/0249* (2013.01); *G03H 1/0244* (2013.01)

(58) Field of Classification Search
CPC ....... G03H 2224/04; G03H 2001/0825; G03H 2001/085; G03H 2001/262; G03H 2210/45; G03H 2210/452; G03H 2240/42; B42D 25/328; G01J 9/0246; G01J 2009/0203; G01J 2009/0249
USPC ........................................................ 359/9–11
See application file for complete search history.

(56) References Cited

U.S. PATENT DOCUMENTS

| | | | |
|---|---|---|---|
| 2013/0107336 A1* | 5/2013 | Wey | G03H 1/0808 359/9 |
| 2019/0094802 A1* | 3/2019 | Kagotani | G02B 5/18 |
| 2020/0183260 A1* | 6/2020 | Fukui | G03H 1/0808 |

FOREIGN PATENT DOCUMENTS

| | | | |
|---|---|---|---|
| JP | 10170865 A | * | 6/1998 |
| JP | H10-170865 A | | 6/1998 |
| JP | 3810934 B2 | | 8/2006 |
| JP | 4256372 B2 | | 4/2009 |
| WO | WO-2017/209113 A1 | | 12/2017 |

OTHER PUBLICATIONS

Extended European Search Report dated Nov. 21, 2019 for corresponding Application No. 17880116.3.
Seung-Cheol Kim et al: "Fast computation of hologram patterns of a 3D object using run-length encoding and novel look-up table methods", Applied Optics, Optical Society of America, Washington, DC; US, vol. 48, No. 6, Feb. 20, 2009 (Feb. 20, 2009), pp. 1030-1041, XP001522250.
International Searching Authority, "International Search Report," issued in connection with International Patent Application No. PCT/JP2017/045178, dated Mar. 13, 2018.
International Searching Authority, "Written Opinion," issued in connection with International Patent Application No. PCT/JP2017/045178, dated Mar. 13, 2018.
Kubota et al., "Holography-Principles and practice-," Asakura Shoten Co., Ltd., Nov. 20, 1995, first Edition 1 printing.

* cited by examiner

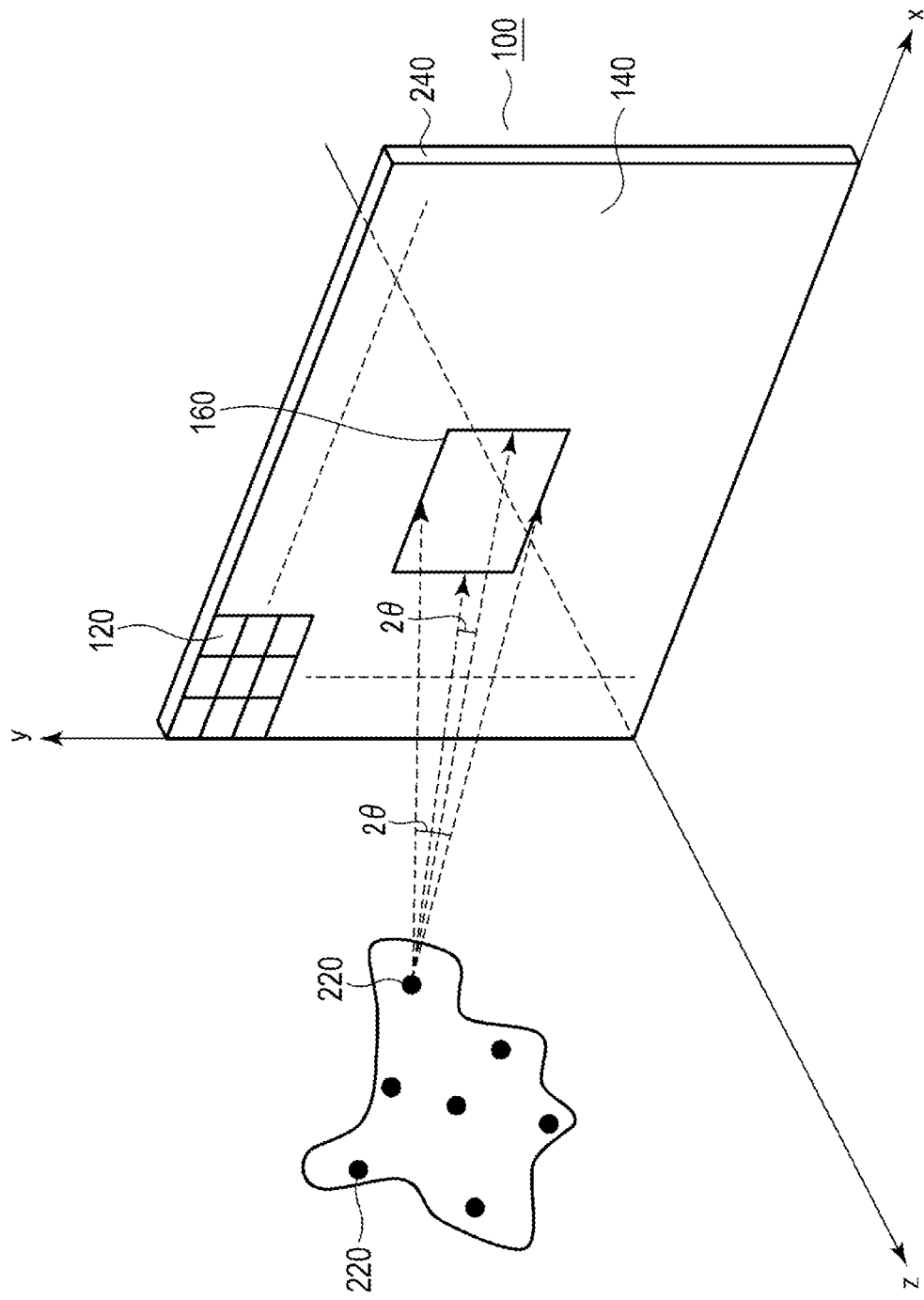

| | REQUIRED TIME (SEC) | DEGREE OF SPPED-UP |
|---|---|---|
| CONVENTIONAL CALCULATION | 180 | 1.0 |
| EXAMPLE | 45 | 4.0 |

US 11,573,527 B2

CALCULATION METHOD, RECORDING METHOD, OPTICAL FILM, AND PHASE MODULATION STRUCTURE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/045178, filed on Dec. 15, 2017, which is based upon and claims the benefit of priority to and Japanese Patent Application No. 2016-243433, filed on Dec. 15, 2016; the disclosures of which are all incorporated herein by reference in their entireties.

TECHNICAL FIELD

Background

The present disclosure relates to a calculation method, a recording method, an optical film, and a phase modulation structure used for recording phases of spatial information calculated by a computer, and applied, for example, to a hologram.

Background Art

Optical films in recent years are controlled based on interference of light which is calculated by a computer. For such optical films, the following patent literatures describe a composite hologram calculated by a computer.

These patent literatures describe a composite hologram by way of examples of usage in securities, card media, and personal authentication media.

Interference fringe information corresponds to information on amplitude of light. In the case where amplitude of light is recorded on an optical film, there is a concern that the intensity of light is reduced when reconstructed, although it depends on the recording method. PTLs 1 and 2 each disclose a technique of reproducing light interference infringes by calculating intensities of interference waves of reference light and object light.

[Citation List] [Patent Literature] [PTL 1] JP 4256372 B2; [PTL 2] JP 3810934 B2; [PTL 3] JP H09-319290 A; [PTL 4] JP H10-123919 A

SUMMARY OF THE INVENTION

However, these calculation methods disclosed by PTLs 1 and 2 are predicated on reference light. Accordingly, if the object light is to be reconstructed, information on the reference light defined at the time of calculation is needed. Specifically, an image can be reconstructed with the same conditions as those at the time of recording only when the optical film is illuminated under the same conditions as those of the reference light information at the time of recording. Thus, an image can be reconstructed only under conditions limited to those of the reference light at the time of recording.

In addition, to calculate a composite hologram with a computer, a large amount of time is required. In light of these circumstances, various techniques for reducing calculation time have been disclosed.

For example, PTLs 3 and 4 disclose a method of dividing an original image and a recording surface to define multiple linear unit regions. This method can reduce calculation time by reducing the number of calculation regions, but unavoidably limits the angle at which the original image is reconstructed, reproducing an image in a different range in the vertical or horizontal direction when actually observed.

The present disclosure has been made in light of such circumstances, and aims to provide a calculation method, a recording method, an optical film, and a phase modulation structure that can quickly calculate and record phases of spatial information for reproducing an image without using the reference light conditions from the time of recording.

To achieve the above object, the present disclosure takes the following steps.

Specifically, a first aspect provides a calculation method used for calculating phases of calculated element regions, the calculated element regions each being formed of a plurality of unit blocks for which phases of light are calculated and corresponding to reconstruction points on a one-to-one basis. The method includes: defining a point on each calculated element region as a center thereof by extending a normal line from the corresponding reconstruction point to the calculated element region arranged on a recording surface; radially dividing the calculated element region into divisions centered on the center of the calculated element region to define one of the divisions as a representative area of the calculated element region; calculating phases for unit blocks that are partially or entirely included in the representative area; copying the phases calculated for the unit blocks that are partially or entirely included in the representative area to an area other than the representative area of the calculated element region by rotating the representative area about the center of the calculated element region during inversion of the representative area; and repeating the rotation and the inversion to calculate phases for all unit blocks in the calculated element region.

In a second aspect according to the calculation method of the first aspect, the reconstruction points are arrayed on a quantization grid.

In a third aspect according to the calculation method of the first or second aspect, the calculated element region has a square shape; lines extending respectively from the corresponding reconstruction point to centers of four sides of the calculated element region form angles that are all θs relative to the normal line extending from the reconstruction point to the center of the calculated element region; and these angles are all θs for other reconstruction points.

In a fourth aspect according to the calculation method of any one of the first to third aspects, the calculated element region has a square shape; and the representative area has a shape of an isosceles right triangle with an oblique line connecting the center of the calculated element region and a vertex of the calculated element region.

In a fifth aspect according to the calculation method of any one of the first to fourth aspects, a phase is calculated according to the following formula:

$$W(x, y) = \sum_{n=0}^{Nmax} W_n(kx, ky) \quad \text{[Math. 1]}$$

$$W_n(kx, ky) = amp_n \cdot \exp(i\phi_n(kx, ky))$$

$$\phi_n(kx, ky) = \frac{\pi}{\lambda \cdot O_n(z)} \{(O_n(x) - kx)^2 + (O_n(y) - ky)^2\}$$

In the formula, $W_n(kx, ky)$ is a phase of a reconstruction point n at coordinates (kx, ky, 0) in a calculated element region for an $n^{th}$ reconstruction point, $W(x, y)$ is a phase recorded at coordinates (x, y, 0), n is an $n^{th}$ reconstruction point (n=0 to Nmax), $amp_n$ is an amplitude of light of an $n^{th}$ reconstruction point, i is an imaginary number, $\lambda$ is a wavelength of light when reproducing the reconstruction point, $O_n(x)$ is an x-coordinate of the reconstruction point, $O_n(y)$ is a y-coordinate of the reconstruction point, $O_n(z)$ is a z-coordinate of the reconstruction point, (x, y, 0) is a coordinate of the unit block, and $\phi_n(kx, ky)$ is a phase angle of an $n^{th}$ reconstruction point.

A sixth aspect provides a calculation method used for calculating phases of calculated element regions, the calculated element regions each being formed of a plurality of unit blocks for which phases of light are calculated and corresponding to reconstruction points on a one-to-one basis. The method includes: grouping reconstruction points equally distant from a recording surface on which the calculated element regions are arranged, so as to belong to the same reconstruction point layer; calculating phases for a calculated element region corresponding to only a first reconstruction point in each reconstruction point layer; and copying the phases calculated for the calculated element region corresponding to the first reconstruction point in the reconstruction point layer, to a calculated element region corresponding to another reconstruction point belonging to the same reconstruction point layer.

A seventh aspect provides a calculation method used for calculating phases of calculated element regions, the calculated element regions each being formed of a plurality of unit blocks for which phases of light are calculated and corresponding to reconstruction points on a one-to-one basis. The method includes: clustering the reconstruction points into reconstruction point clusters; calculating phases of calculated element regions for reconstruction points in a first reconstruction point cluster; and copying the calculated phases of the calculated element regions for the reconstruction points in the first reconstruction point cluster to calculated element regions for reconstruction points in a second reconstruction point cluster which is identical with the first reconstruction point cluster in terms of arrangement and distances from the recording surface where the calculated element regions are arranged.

An eighth aspect provides a recording method including: recording a phase angle as a retardation on the recording surface of an optical film by using a phase obtained by the calculation method according to any one of the first to seventh aspects. The phase angle is obtained according to the following formula:

$$\phi(x,y)=\arg(W(x,y)) \quad \text{[Math 2]}$$

The obtained phase angle is recorded as a retardation.

A ninth aspect provides a phase modulation structure including: a recording surface including phase angle recording regions in a plurality of calculated element regions corresponding to reconstruction points of an image on a one-to-one basis, each phase angle recording region being formed of a plurality of unit blocks in each of which a phase angle is recorded, the phase angle being calculated based on a phase that is a sum of a plurality of phases of light from the corresponding reconstruction points; and a representative area that is one of divisions of the calculated element region, the representative area being obtained by radially dividing the calculated element region centered on a point on the calculated element region, the point being obtained by extending a normal line from the corresponding reconstruction point to the calculated element region on the recording surface. In the phase modulation structure, the representative area produces the calculated element region by being rotated about the center of the calculated element region during inversion of the representative area; and with the representative area being rotated about the center of the calculated element region during inversion of the representative area, phases of unit blocks partially or entirely included in the representative area are defined in corresponding unit blocks of another calculated element region so as to be the same as the phases of the corresponding unit blocks of the representative area.

In a tenth aspect according to the phase modulation structure of the ninth aspect, the reconstruction points are arrayed on a quantization grid.

In an eleventh aspect according to the phase modulation structure of the ninth or tenth aspect, the calculated element region has a square shape; lines extending respectively from the corresponding reconstruction point to centers of four sides of the calculated element region form angles that are all $\theta$s relative to the normal line extending from the reconstruction point to the center of the calculated element region; and these angles are all $\theta$s for other reconstruction points.

In a twelfth aspect according to the phase modulation structure of any one of the nine to eleven aspects, the calculated element region has a square shape; and the representative area among the plurality of unit blocks in the calculated element region has a shape of an isosceles right triangle with an oblique line connecting the center of the calculated element region and a vertex of the calculated element region.

In a thirteenth aspect according to the phase modulation structure of any one of the ninth to twelfth aspects, a phase is calculated according to the following formula:

$$W(x, y) = \sum_{n=0}^{Nmax} W_n(kx, ky) \quad \text{[Math. 3]}$$

$$W_n(kx, ky) = amp_n \cdot \exp(i\phi_n(kx, ky))$$

$$\phi_n(kx, ky) = \frac{\pi}{\lambda \cdot O_n(z)}\{(O_n(x) - kx)^2 + (O_n(y) - ky)^2\}$$

In the formula, $W_n(kx, ky)$ is a phase of a reconstruction point n at coordinates (kx, ky, 0) in a calculated element region for an $n^{th}$ reconstruction point, W(x, y) is a phase recorded at coordinates (x, y, 0), n is an $n^{th}$ reconstruction point (n=0 to Nmax), $amp_n$ is an amplitude of light of an $n^{th}$ reconstruction point, i is an imaginary number, $\lambda$ is a wavelength of light when reproducing the reconstruction point, $O_n(x)$ is an x-coordinate of the reconstruction point, $O_n(y)$ is a y-coordinate of the reconstruction point, $O_n(z)$ is a z-coordinate of the reconstruction point, (x, y, 0) is a coordinate of the unit block, and $\phi_n(kx, ky)$ is an $n^{th}$ phase angle.

A fourteenth aspect provides a phase modulation structure including: a recording surface including phase angle recording regions in a plurality of calculated element regions that correspond to reconstruction points on a one-to-one basis, each phase angle recording region being formed of a plurality of unit blocks in each of which a phase angle is recorded, the phase angle being calculated based on a phase that is a sum of a plurality of phases of light from the corresponding reconstruction points. In the phase modulation structure, phases calculated for the calculated element regions for reconstruction points that are equally distant from the recording surface are the same.

A fifteenth aspect provides a phase modulation structure including: a recording surface including phase angle recording regions in a plurality of calculated element regions that correspond to reconstruction points on a one-to-one basis, each phase angle recording region being formed of a plurality of unit blocks in each of which a phase angle is recorded, the phase angle being calculated based on a phase that is a sum of a plurality of phases of light from the corresponding reconstruction points. In the phase modulation structure, phases calculated for the calculated element regions for reconstruction points are the same between reconstruction point clusters which are identical in terms of arrangement and distances from the recording surface.

A sixteenth aspect provides an optical film. In the optical film, the phase modulation structure according to any one of the ninth to fifteenth aspects is arranged on the recording surface.

A seventeenth aspect provides an optical film of the sixteenth aspect on which personal authentication information is recorded.

According to the calculation method of the first aspect and the phase modulation structure of the ninth aspect, data to be recorded in the unit blocks of a calculated element region only have to be calculated for the unit blocks included in a representative area without the need of performing calculation for all the unit blocks. Thus, calculation time can be reduced.

According to the calculation method of the second aspect and the phase modulation structure of the tenth aspect, reconstruction points are arrayed on a quantization grid. Thus, calculation time can be reduced.

According to the calculation method of the third aspect and the phase modulation structure of the eleventh aspect, all angles formed relative to the line extending from the reconstruction point to the center of the corresponding calculated element region are the same. Thus calculation time can be reduced.

According to the calculation method of the fourth aspect and the phase modulation structure of the twelfth aspect, the representative area has a shape of an isosceles right triangle. Thus, calculation time can be reduced.

According to the calculation method of the fifth aspect and the phase modulation structure of the thirteenth aspect, phases can be calculated using a specific formula.

According to the calculation method of the sixth aspect and the phase modulation structure of the fourteenth aspect, phases calculated for a calculated element region corresponding to one reconstruction point in the reconstruction point layer are copied to a calculated element region corresponding to another reconstruction point belonging to the same reconstruction point layer. Thus, calculation time can be reduced.

According to the calculation method of the seventh aspect and the phase modulation structure of the fifteenth aspect, the reconstruction points are clustered into reconstruction point clusters; and calculated phases of the calculated element regions for the reconstruction points in a first reconstruction point cluster are copied to calculated element regions for reconstruction points in a second reconstruction point cluster which is identical with the first reconstruction point cluster in terms of arrangement and distances from the recording surface.

According to the recording method of the eighth aspect, phases can be recorded on an optical film.

According to the optical film of the sixteenth aspect, a phase modulation structure can be arranged thereon.

According to the optical film of the seventeenth aspect, personal authentication information can be recorded thereon.

BRIEF DESCRIPTION OF THE DRAWINGS

FIG. 1 illustrates an optical film according to a first embodiment.

DETAILED DESCRIPTION OF REPRESENTATIVE EMBODIMENTS

Figure 2A:
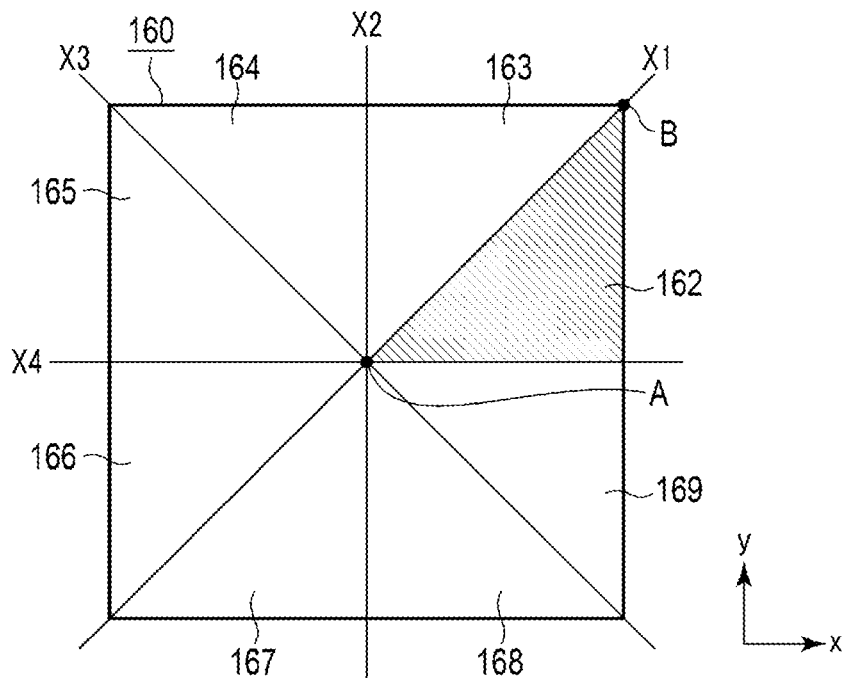
FIG. 2A illustrates a calculation method according to the first embodiment (1/5).

With reference to the drawing, a description will now be given of representative embodiments according to the present invention. The present invention is not limited to the following representative embodiments, and appropriate modifications can be made without departing from the spirit of the present invention. The representative embodiments described below are merely examples of the present invention, and the design thereof could be appropriately changed by one skilled in the art. Here, the drawing is schematic, and the relationship between thickness and plane size, the ratio of the thickness of each layer, etc., are different from actual ones. The embodiments described below are merely examples of the configurations for embodying the technical idea of the present invention, and the technical idea of the present invention should not limit the materials, shapes, structures, and the like of the components to those described below. The technical idea of the present invention can be modified in various ways within the technical scope specified by the claims.

The same constituent elements are denoted by the same reference numerals unless there is a reason for the sake of convenience, and redundant description is omitted. In the drawings referred to in the following description, for clarity, characteristic parts are enlarged, and thus the components are not shown to scale. It is, however, clear that one or more embodiments can be implemented without such details. In addition, known structures and devices may be schematically represented for simplicity.

First Embodiment

FIG. 1 is a diagram illustrating an optical film according to a first embodiment of the present disclosure.

An optical film 100 of the present embodiment includes a recording surface 140 formed of a plurality of unit blocks 120 arranged in a grid pattern on an x-y plane. The recording surface 140 corresponds to a surface of a phase modulation structure 240. The recording surface 140 defines calculated element regions 160 thereon according to viewing angles θ from respective reconstruction points 220 at which an image is reconstructed In each calculated element region 160, a plurality of unit blocks 120 are arranged. Phases of light from the corresponding reconstruction point 220 are calculated in conformity with the locations of the unit blocks 120 in the calculated element region 160 and the calculated phases are used as a basis for calculating phase angles, for recordation in the respective unit blocks. Thus, the calculated element region 160 can be a phase-recording element region.

The unit blocks 120 can be arranged at a pitch that is half or less the wavelength of light, and more specifically, at a pitch in the range of 10 nm inclusive to 400 nm. Each unit block 120 has sides each having a length that is half or less the wavelength of light, and more specifically in the range of 10 nm inclusive to 400 nm. When the phase modulation structure 240 is used for light reflection, each unit block 120 may have a height (depth) that is approximately half the wavelength of light in a medium. When the phase modulation structure 240 is used for light transmission, the retardation may be approximately the optical wavelength. More specifically, each unit block 120 may have a height (depth) in the range of 100 nm or more and 300 nm or less when the phase modulation structure 240 is used for light reflection, and may have a height (depth) in the range of 1 μm or more and 10 μm or less when used for light transmission. In either use, each unit block 120 may have a height (depth) in the range of 100 nm or more and 10 μm or less.

Each calculated element region 160 may have sides each having a length in the range of 50 μm or more and 15 mm or less. It should be noted that the distance from each reconstruction point 220 to the recording surface 140 may be in the range of 0.3 mm or more and 30 mm or less.

To reduce calculation time in the present embodiment, phase values recorded in part of the unit blocks 120 of the recording element region of the recording surface 140 are used as phase values of other unit blocks 120. This will be described referring to FIGS. 2A to 2E. Specifically, to reduce calculation time in the present embodiment, phases are calculated only for the unit blocks that are partially or entirely included in a representative calculation area (hereinafter referred to as a representative area) 162 as hatched in FIG. 2A, instead of calculating for all the unit blocks 120 in the calculated element region 160.

The representative area 162 refers to an area that forms a calculated element region 160 by being rotated clockwise or counterclockwise about a center A of the calculated element region 160 during inversion of the representative area 162. As shown in FIG. 2A, if the calculated element region 160 has a square shape, the representative area 162 will have a shape of an isosceles right triangle that has an oblique line segment A-B connecting the center A of the calculated element region 160 and a vertex B of the calculated element region 160.

Figure 2B:
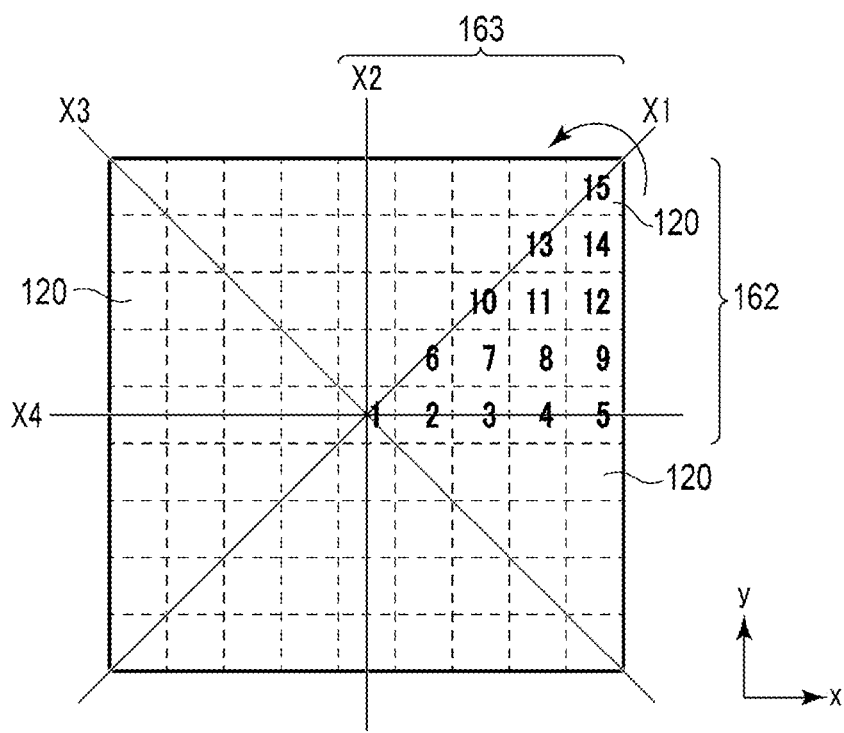
FIG. 2B illustrates a calculation method according to the first embodiment (2/5).

FIG. 2B is a diagram illustrating a state where data 1 to 15 are recorded on the representative area 162 as a result of a computer calculating phases of the unit blocks 120 that are partially or entirely included in the representative area 162. The data 1 to 15 correspond to phase data.

Figure 2C:
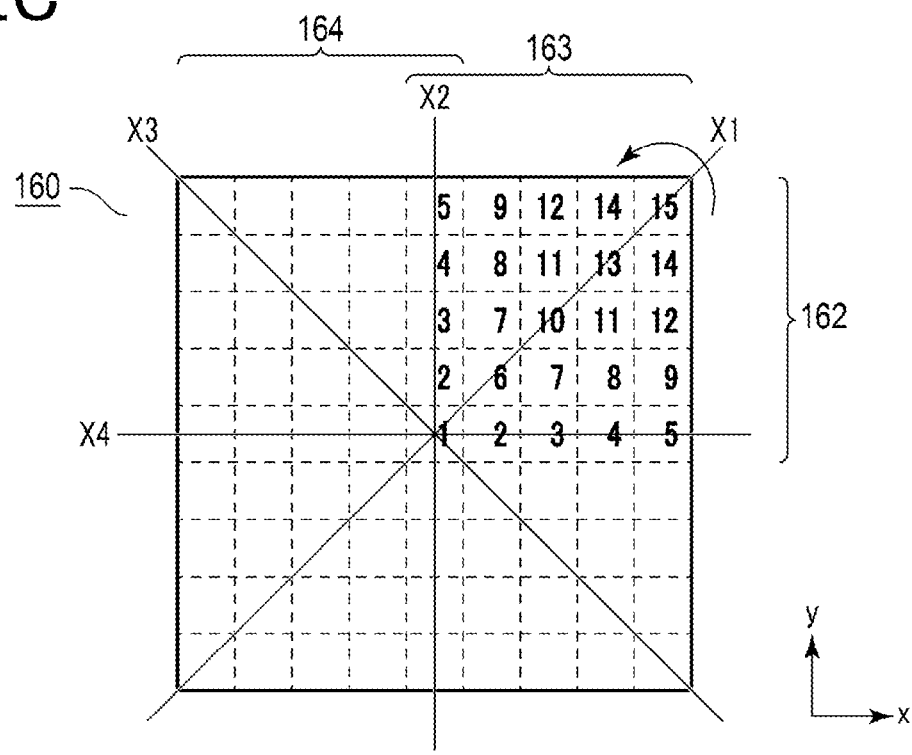
FIG. 2C illustrates a calculation method according to the first embodiment (3/5).

To copy phases to a copy area 163, the representative area 162 is rotated about the center A of the calculated element region 160, while being inverted about a symmetry line X1. Thus, as shown in FIG. 2C, the phase data 1 to 15, which are recorded in the unit blocks that are partially or entirely included in the representative area 162, are used as phase data for the corresponding unit blocks in the copy area 163 that has been defined by the inversion. As a result, unit blocks symmetric about the symmetry line X1 can share the same phase data. There is no need to copy new data to the unit blocks located on the symmetry line X1 because data 1, 6, 10, 11 and 15 are already present in these unit blocks.

Figure 2D:
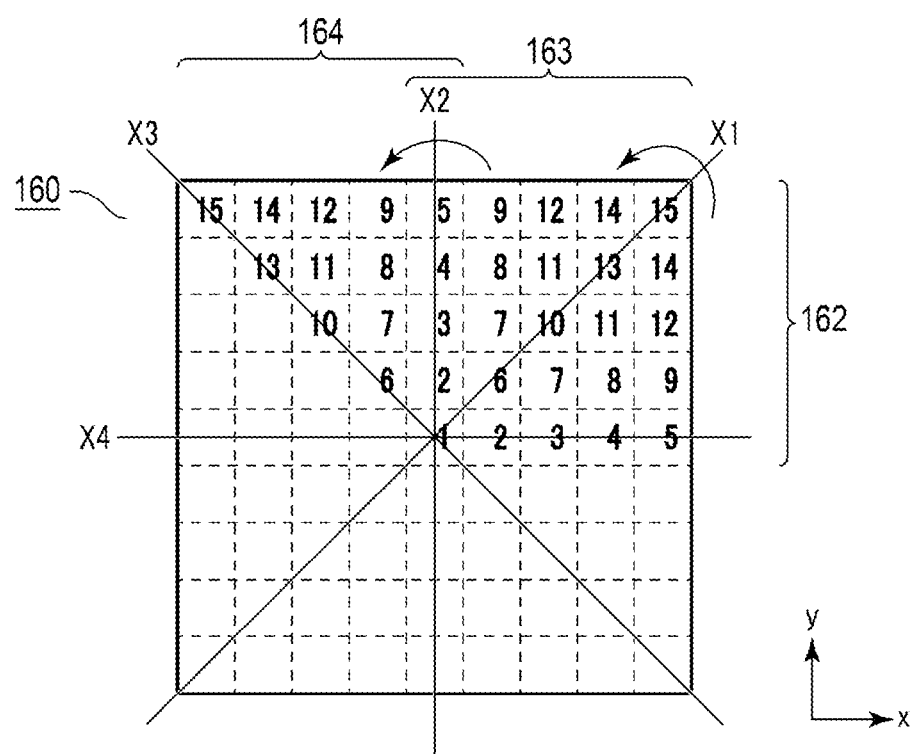
FIG. 2D illustrates a calculation method according to the first embodiment (4/5).

Then, the copy area 163 is rotated about the center A of the calculated element region 160, while being inverted about a symmetry line X2 of the calculated element region 160 as a reference line. Thus, as shown in FIG. 2D, the phase data 1 to 15, which are recorded in the unit blocks 120 that are partially or entirely included in the copy area 163, are used as phase data for the corresponding unit blocks 120 in a copy area 164 that has been defined by the inversion. As a result, the unit blocks symmetric about the symmetry line X2 can use a copy of the same phase data. No phase data is copied to unit blocks located on the symmetry line X2 because data 1, 2, 3, 4 and 5 are already present in these unit blocks.

Similarly, the copy area 164 is rotated about the center A of the calculated element region 160, while being inverted about a symmetry line X3 of the calculated element region 160 as a reference line to copy the same phase data to the unit blocks which are symmetric about the symmetry line X3.

Figure 2E:
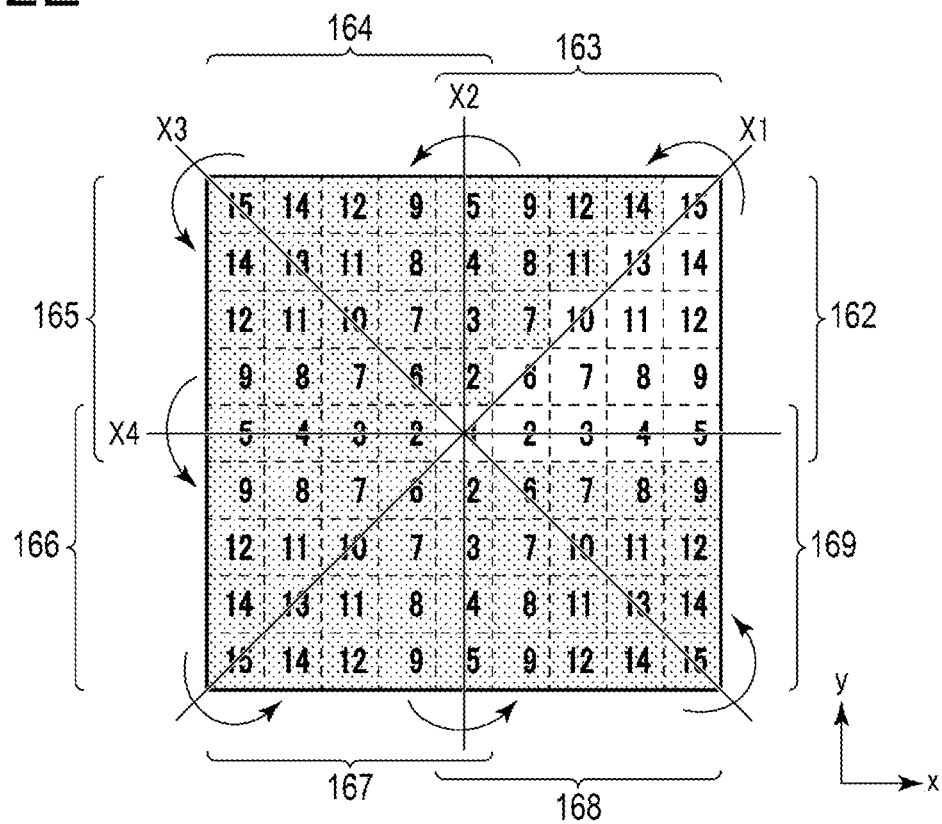
FIG. 2E illustrates a calculation method according to the first embodiment (5/5).

Iterating such processing, the phase data are finally copied, as shown in FIG. 2E, to the corresponding unit blocks of copy areas 166, 167, 168 and 169 so that all the unit blocks in the calculated element region 160 are provided with the phase data. In other words, between the adjacent areas (representative area 162 and copy areas 163 to 169), the same data are copied to the unit blocks in a symmetric relation, centered on the symmetry lines X1 to X4. Of the unit blocks shown in FIG. 2E where phase data 1 to 15 are recorded, those which are assigned with the same numbers have the same distances from the reconstruction point 220.

As described above, in the present embodiment, phases are calculated only for the unit blocks, whose distances from the reconstruction point 220 are different from the distances of the unit blocks in the preceding area, instead of calculating phases for all the unit blocks 120 in the calculated element region 160. Specifically, calculation is omitted for the unit blocks, whose distances from the reconstruction point 220 are equal to the distances of the unit blocks in the preceding area, and previously calculated data are copied. Thus, calculation time is reduced. In FIGS. 2A to 2E, the calculated element region 160 includes 81 unit blocks 120, but phases are actually calculated only for 15 of them instead of all 81. Thus, calculation time is greatly reduced.

To apply such a method, however, the x-y coordinates of the reconstruction point 220 are required to match the x-y coordinates of the center A of the calculated element region 160, and the phases of the calculated element region 160 are required to have symmetry about the center A as a symmetric point. If the x-y coordinates of the reconstruction point 220 do not match the x-y coordinates of the center A of the center unit block 120 at the center of the calculated element region 160, the following process is performed in the present embodiment. Specifically, prior to the calculation described referring to FIGS. 2A to 2E, the positions of the x-y coordinates of the reconstruction point 220 are shifted on the x-y plane for matching with the x-y coordinates of the center A of the unit block 120 at the center of the calculated element region 160.

The x-y coordinates of the reconstruction points 220 of a pattern (3D object) and the x-y coordinates of the calculated element regions 160 are both known in advance. Therefore, the offsets of the x-y coordinates of each reconstruction point 220 in the x and y directions are unambiguously determined. If the x-y coordinates of a reconstruction point 220 match the x-y coordinates of the center A of the corresponding calculated element region 160, the offsets are 0.

Figure 3A:
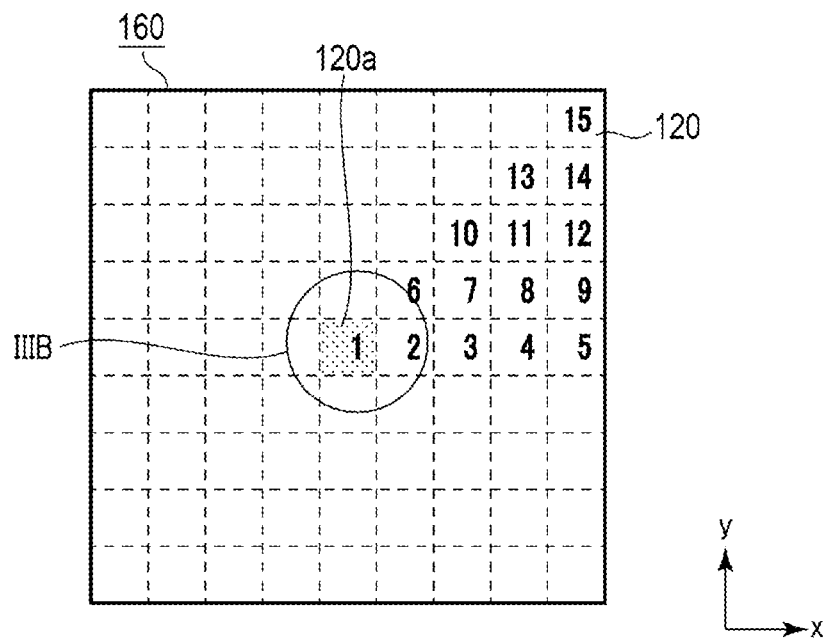
FIG. 3A illustrates a positional shift of a reconstruction point (1/3).
Figure 3B:
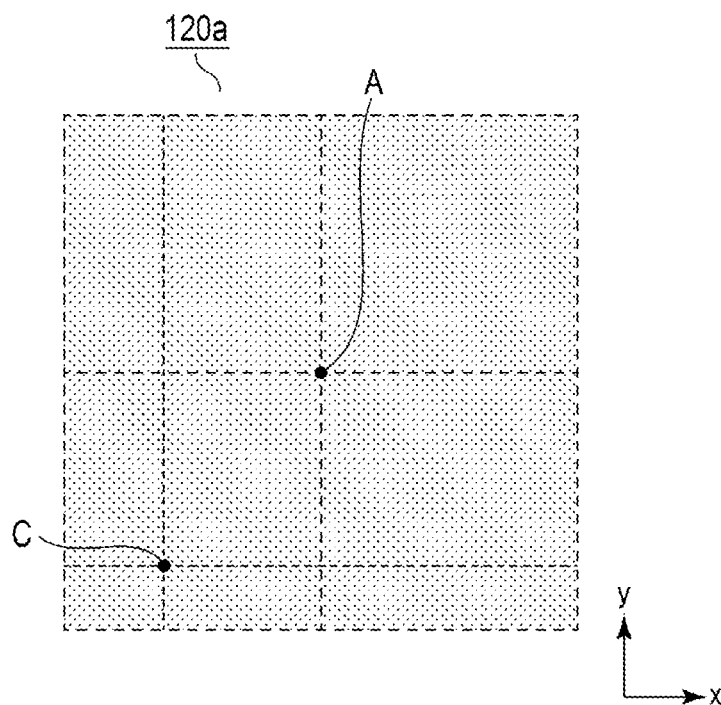
FIG. 3B illustrates a positional shift of a reconstruction point (2/3).
Figure 3C:
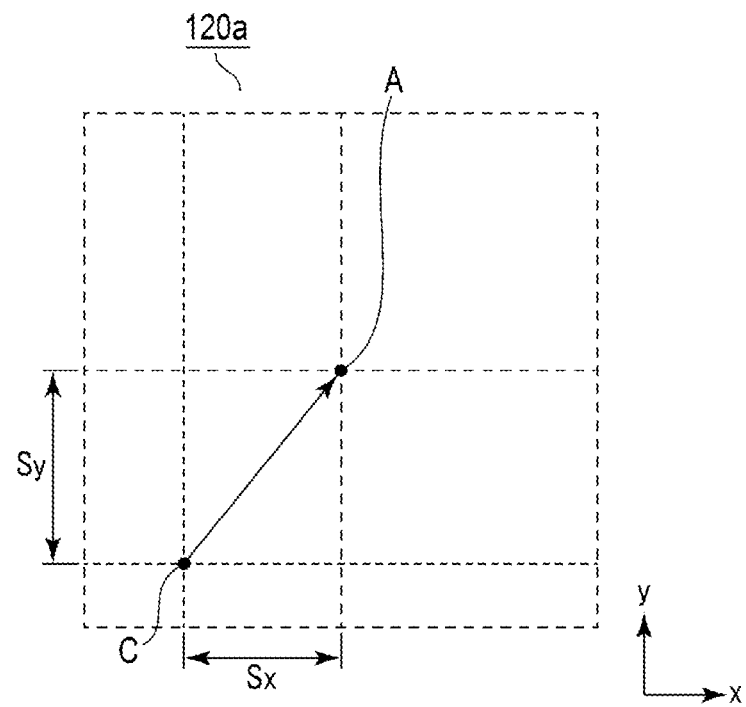
FIG. 3C illustrates a positional shift of a reconstruction point (3/3).

Referring now to FIGS. 3A to 3C, shifting of x-y coordinates of a reconstruction point 220 will be described.

FIG. 3A, which is similar to FIG. 2B, shows a state where data 1 to 15 are recorded in the unit blocks 120 partially or entirely included in the representative area 162.

In this case, however, the x-y coordinates of a position C of the reconstruction point 220 do not match, as shown in FIG. 3B, the center A of the unit block 120a at the center. In this case, the distances from the center A to the unit blocks in the copy areas 163 to 169 will be different from the distances from the center A to the unit blocks in the representative area 162, losing symmetry. Therefore, the data of the representative area 162 cannot be copied to these copy areas in the way described referring to FIGS. 2A to 2E.

Therefore, as shown in FIG. 3C, the x-y coordinates of the position C of the reconstruction point 220 are shifted on the x-y plane for matching with the x-y coordinates of the center A of the unit block 120a at the center of the calculated element region 160. In other words, the x-y coordinates of the position C are shifted by Sx in the x direction and Sy in the y direction. Thus, the position C of the reconstruction point 220 is shifted so as to match the x-y coordinates of the center A of the unit block 120a at the center of the calculated element region 160 to ensure symmetry in the representative area 162, and then, data are copied to the copy areas 163 to 169 as described referring to FIGS. 2A to 2E.

If the x-y coordinates of the position C of the reconstruction point 220 are shifted so as to match the x-y coordinates of the center A of the unit block 120a at the center of the calculated element region 160, this shifting will make a state that is different from the exact state. Practically, however, the x-y coordinates of the position C of the reconstruction point 220 are displaced from the x-y coordinates of the center A of the unit block 120a at the center of the calculated element region 160 by a distance that is approximately half of the size of a single unit block at maximum. Since each unit block has a size of approximately several tens of nanometers to several tens of micrometers, such a displacement is not visually recognizable. Thus, even when the x-y coordinates of the position C of the reconstruction point 220 are shifted on the x-y plane so as to match the x-y coordinates of the center A of the unit block 120a at the center of the calculated element region 160, the militate of the difference from the exact state is so small as to be negligible.

Figure 4A:
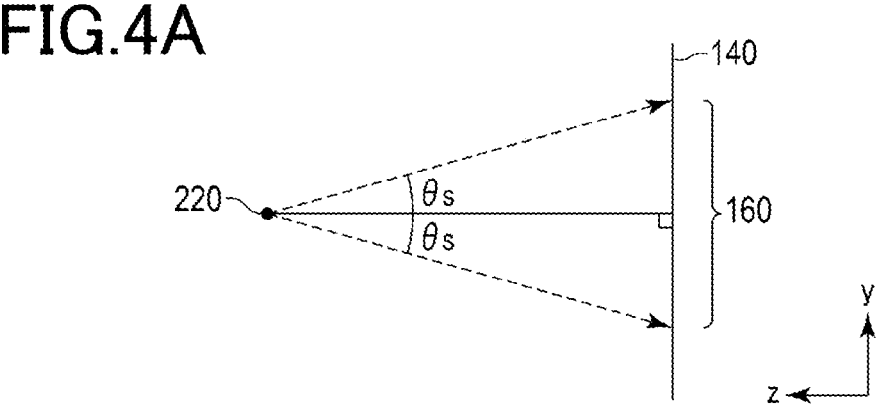
FIG. 4A illustrates a viewing angle from a reconstruction point.
Figure 4B:
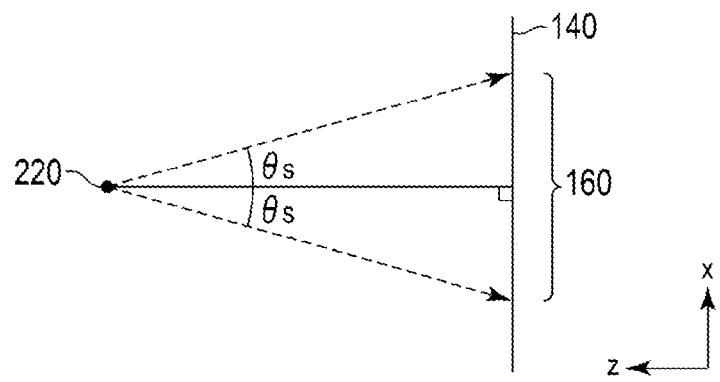
FIG. 4B illustrates a viewing angle from a reconstruction point.

FIGS. 4A and 4B show that angles θs for defining a calculated element region 160 from a reconstruction point 220 are the same. If the angles are within θs, the ranges for reproducing the reconstruction point 220 are the same between the vertical and horizontal directions.

Figure 5:
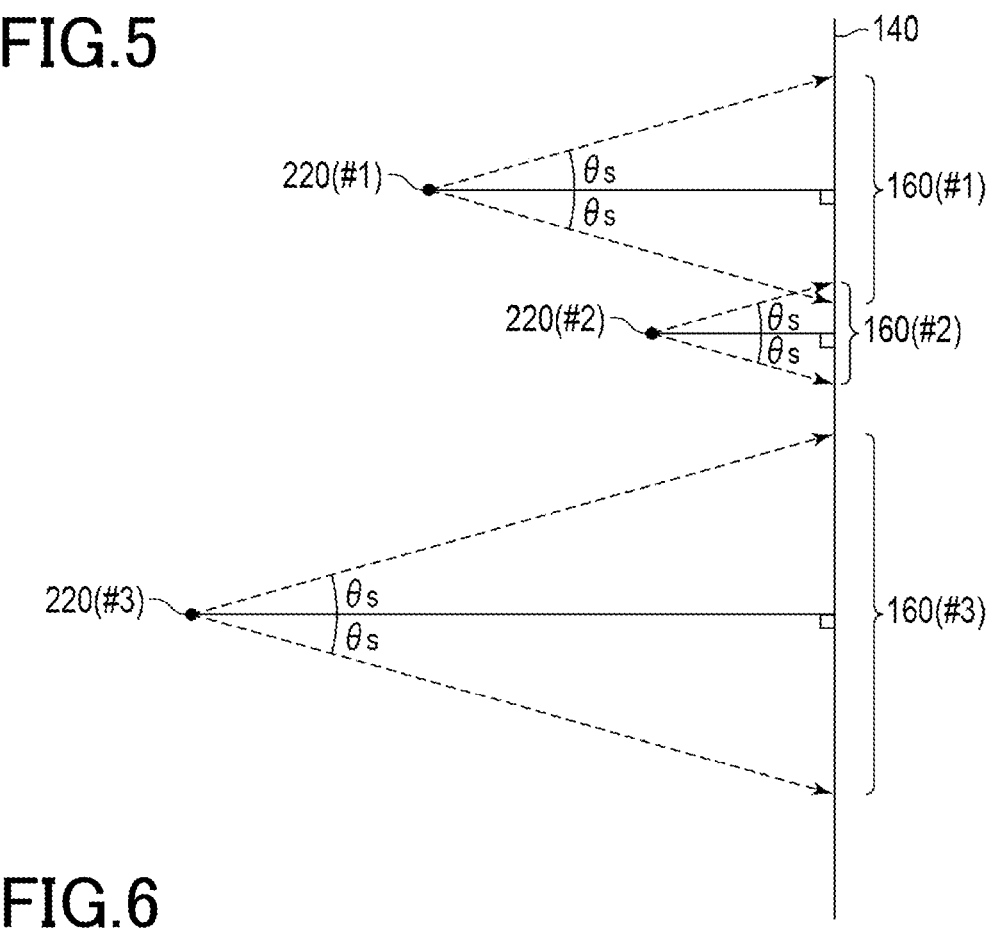
FIG. 5 illustrates a viewing angle from a reconstruction point.

FIG. 5 shows that angles θs for defining calculated element regions 160(#1) to 160(#3) from reconstruction points 220(#1) to 220(#3) are the same. Thus, if the angles are within θs, the ranges of reproducing the respective reconstruction points 220(#1) to 220(#3) are the same between the vertical and horizontal directions.

If the calculated element region 160 has a square shape as shown in FIGS. 2A to 2E, the angles are all θs for the lines connecting the reconstruction point 220 to respective center points of the four sides of the calculated element region 160, relative to the line connecting the reconstruction point 220 to the center of the calculated element region 160. These angles θs are the same for other reconstruction points 220.

The angle θs relative to the line connecting the reconstruction point 220 to the center of the calculated element region 160 may be in the range of 5 degrees or more and 30 degrees or less.

In FIG. 5, two calculated element regions 160(#1) and 160(#2) overlap with each other. If a plurality of calculated element regions 160 overlap with each other, the computer calculates a phase angle (1)(x, y) based on a sum of phases W(x, y) and records numerical information of the calculated phase angle ϕ in the unit block at the corresponding coordinates (x, y).

Figure 6:
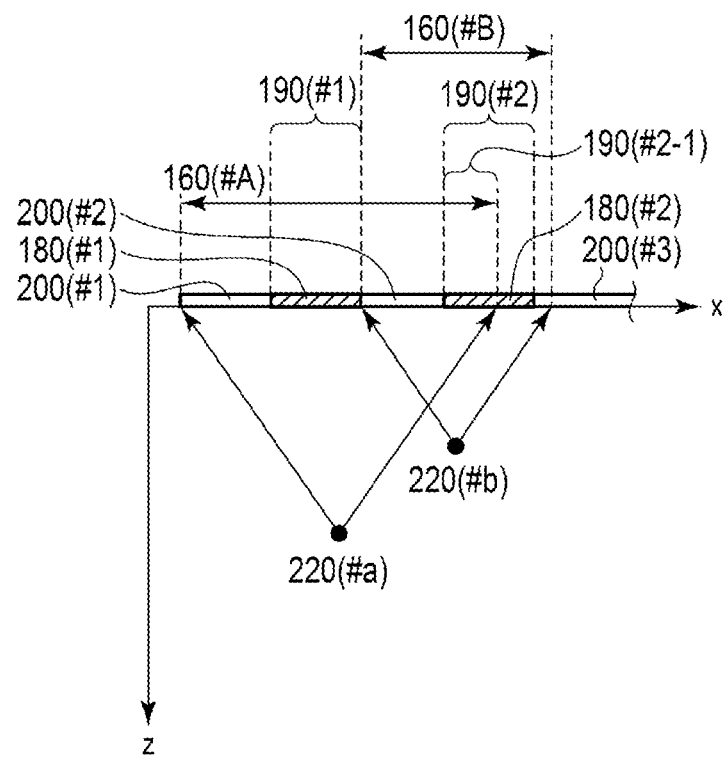
FIG. 6 illustrates a plurality of calculated element regions with overlaps.

First, the computer calculates, as shown in FIG. 6, a phase W(x, y) of light from a reconstruction point 220(#a) for each unit block 120 which is included in an overlap region 190(#1) and an overlap region 190(#2-1). In the overlap region 190(#1), a calculated element region 160(#A) defined by the reconstruction point 220(#a) overlaps with a phase angle recording region 180(#1). In the overlap region 190(#2-1), the calculated element region 160(#A) overlaps with part of a phase angle recording region 180(#2).

There are one or more reconstruction points 220. For one reconstruction point 220, there is one corresponding calculated element region 160. If a plurality of reconstruction points 220 are present, calculated element regions 160 are present for the reconstruction points 220 on a one-to-one basis. In other words, the number of calculated element regions 160 is the same as that of the reconstruction points 220.

If there are a plurality of reconstruction points 220, the computer further calculates, as shown in FIG. 6, a phase W(x, y) of light from another reconstruction point 220(#b) for each unit block 120 which is included in an overlap region 190(#2). In the overlap region 190(#2), a calculated element region 160(#B) defined by the reconstruction point 220(#b) overlaps with a phase angle recording region 180 (#2).

As shown in FIG. 6, if two calculated element regions 160(#A) and 160(#B) overlap with each other, the computer calculates a sum of the phases W(x, y).

Furthermore, the computer calculates a phase angle (1)(x, y), based on the calculated phase W(x, y), and records numerical information of the calculated phase angle (1)(x, y) in the corresponding overlap region 190 as a retardation. The formula for calculating a phase angle (1)(x, y) from a phase is as follows.

$$\phi(x, y) = \arg(W(x, y)) \quad [\text{Math. 4}]$$

$$W(x, y) = \sum_{n=0}^{Nmax} W_n(kx, ky)$$

$$W_n(kx, ky) = amp_n \cdot \exp(i\phi_n(kx, ky))$$

$$\phi_n(kx, ky) = \frac{\pi}{\lambda \cdot O_n(z)} \{(O_n(x) - kx)^2 + (O_n(y) - ky)^2\}$$

In the formula, $W_n(kx, ky)$ is a phase of a reconstruction point n at coordinates (kx, ky) in a calculated element region 160 for an $n^{th}$ reconstruction point, W(x, y) is a phase recorded in a phrase modulation structure at coordinates (x, y, 0), n is the $n^{th}$ reconstruction point (n=0 to Nmax), $amp_n$ is an amplitude of light of the $n^{th}$ reconstruction point, i is an imaginary number, λ is a wavelength of light at which an image is reconstructed with a group of reconstruction points 220, $O_n(x)$ is an x-coordinate of the reconstruction point, $O_n(y)$ is a y-coordinate of the reconstruction point, $O_n(z)$ is a z-coordinate of the reconstruction point, (kx, ky, 0) are coordinates of a unit block, and $\phi_n(kx, ky)$ is a phase angle of an $n^{th}$ reconstruction point. A phase $W_n(kx, ky)$ is calculated for all the points of the calculated element region 160. Since phases of the reconstruction point n are the same if the distances from the reconstruction point 220 are the same, calculated phase data can be copied. As will be described below, reconstruction points whose values of z-coordinates $O_n(z)$ are the same, i.e. whose distances from the recording surface are the same, will have phases $W_n(kx, ky)$ with the same distribution, and thus previously calculated phase data can be copied. For the coordinates (kx, ky) in each calculated element region 160 with center coordinates being (0, 0), the x-coordinate of the corresponding reconstruction point $O_n$ is $O_n(x)$ and the y-coordinate is $O_n(y)$. Thus, the coordinates (kx, ky) establish a relation with coordinates (x, y) on the recording surface 140 as expressed by $x=kx+O_n(x)$ and $y=ky+O_n(y)$.

If there is an increase in the number of phases of a reconstruction point 220 for which numerical phase data are recorded in the unit blocks 120, data amount and calculation time increase accordingly. If each reconstruction point 220 has an excessive number of phases to be recorded, this may be a factor of deteriorating contrast of the image reconstructed at the reconstruction points 220. Therefore, to reconstruct a clearer image, overlap of the calculated element regions 160 is preferably small in portions where the phase angle recording regions 180 of a plurality of reconstruction points 220(#a, #b) overlap with each other as, for example, in the overlap region 190(#2-1), i.e. it is preferable that a smaller number of calculated element regions is present in the phase angle recording region 180.

The phase angle recording region 180 may be permitted to include only one calculated element region 160 to prevent overlap. If the phase angle recording region 180 includes a plurality of element regions 160, the number thereof may be 256 or less. In this case, calculation may be performed more efficiently. The phase angle recording region 180 may include 16 or fewer number of calculated element regions 160. In this case, a clear image may be easily obtained.

Figure 7:
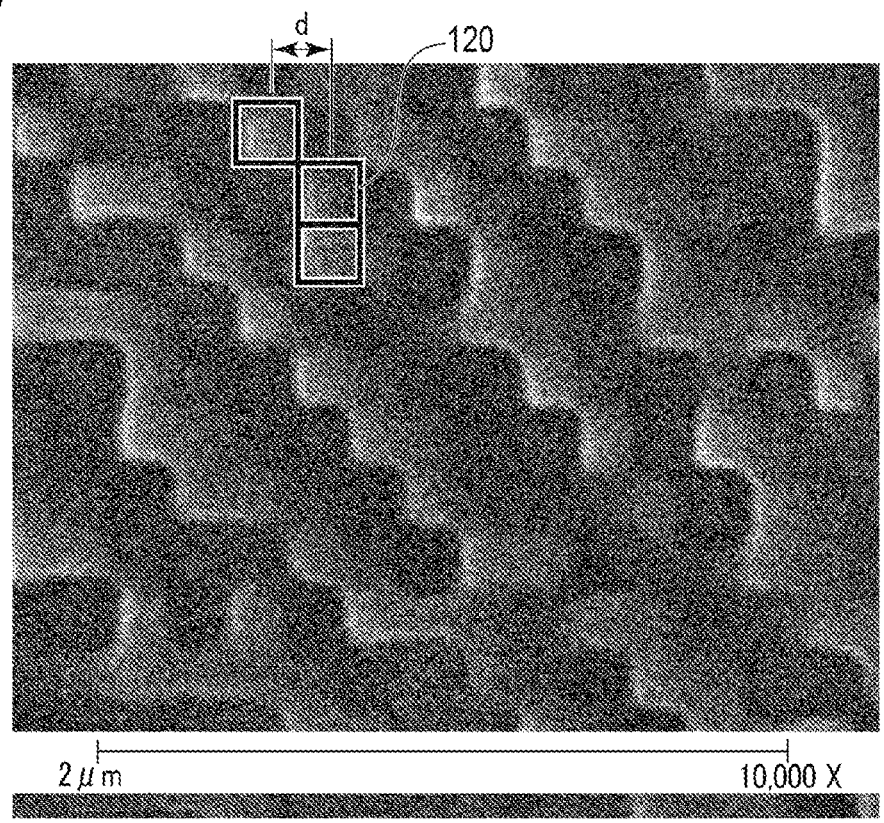
FIG. 7 is a SEM image showing an example of unit blocks where respective phase angles are recorded.

The computer then calculates a phase W(x, y) for each unit block 12 in the overlap region 190 where a calculated element region 160 defined by the viewing angle θ overlaps with a phase angle recording region 180, and calculates a phase angle ϕ(x, y) from the phase W(x, y). Since the upper limit of the viewing angle θ is defined as described above, and the region for which a phase angle ϕ is calculated is limited to the overlap region 190, the time taken for calculation is reduced. The calculated phase angle ϕ is recorded as a retardation in the corresponding unit block 120 in the overlap region 190. FIG. 7 is a SEM image showing unit blocks 120 where respective phase angles ϕ are recorded. The unit blocks 120 shown in FIG. 7 are each in a square shape with a length d on a side, and are two-dimensionally arrayed at an interval d in both x and y directions.

In addition to the phase angle recording region 180, the recording surface 140 may include a phase angle non-recording region 200. Since the phase angle non-recording region 200 is not subjected to calculation with the computer even when overlapped with a calculated element region 160, no phase angles are recorded in the phase angle non-recording region 200. Instead, data other than phase angles, such as data regarding scattering, reflection and diffraction characteristics of light, may be recorded in the phase angle non-recording region 200. Alternatively, the phase angle non-recording region 200 may be made translucent and provided with a print thereon. This can enhance designability of the phase modulation structure 240 having the recording surface.

A reconstructed image can be displayed as phase differences or a group of reconstruction points 220. If a pattern with a meaningful shape is formed, the image reconstructed at the reconstruction points 220 may be permitted to be meaningful and exert dynamic three-dimensional effects. The meaningful reconstructed image can be used as personal authentication information.

Figure 8:
FIG. 8 is a conceptual diagram illustrating an example of a personal authentication medium on which a hologram is displayed.

FIG. 8 is a diagram illustrating a personal authentication medium 300 on which a pattern 170 with a meaningful shape is displayed with a reconstructed image.

Such a personal authentication medium 300 may be produced as follows.

First, a pattern 170 with a meaningful shape is formed in calculated element regions 160. Then, according to the pattern 170, an image is reconstructed at the reconstruction points 220 of the personal identification medium 300, such as an ID card. This reconstructed image, which should be visually recognizable, can present not only picture patterns but also characters.

A description will now be given of advantageous effects of the optical film 100 of the present embodiment configured as described above.

In the optical film 100 of the present embodiment, phases of light from an image reconstruction point 220 are calculated only for unit blocks 120 that are partially or entirely included in a representative area 162, rather than for all the unit blocks in the calculated element region 160. For unit blocks in other areas (copy areas 163 to 169), data of some unit block are copied and recorded from among the unit blocks in the representative area 162. Some unit blocks in this case correspond to the unit blocks in the area 162, whose distances from the reconstruction point 220 are equal to those of the unit blocks in other areas.

For example, if the calculated element region 160 has a square shape, the representative area 162 will have a shape of an isosceles right triangle, as shown in FIGS. 2A to 2E, with an area that is ⅛ of the calculated element region 160. Thus, calculation is actually performed for only 15 unit blocks 120 from among 81 unit blocks forming the calculated element region 160. Accordingly, phases of spatial information can be calculated and recorded in a short time.

Furthermore, in the calculation, only phase angles are calculated, leaving light amplitude information as it is. Accordingly, only phases of light are modulated and amplitude of light is not modulated in theory. Thus, light can be controlled, while being kept highly luminous with no change in brightness.

Second Embodiment

An optical film according to a second embodiment will be described. In the following description, components having functions identical with or similar to those of the first embodiment are denoted by the same reference signs throughout the drawings to omit duplicate description.

As described in the first embodiment, numerical information of phase angles $\phi$, as data 1 to 15, are recorded in the unit blocks 120. In an optical film 100 of the present embodiment, asperity heights conforming to the phase angles $\phi$ are reconstructed in the corresponding unit blocks 120, instead of recording numerical information of the phase angles $\phi$ in the unit blocks 120.

Figure 9A:
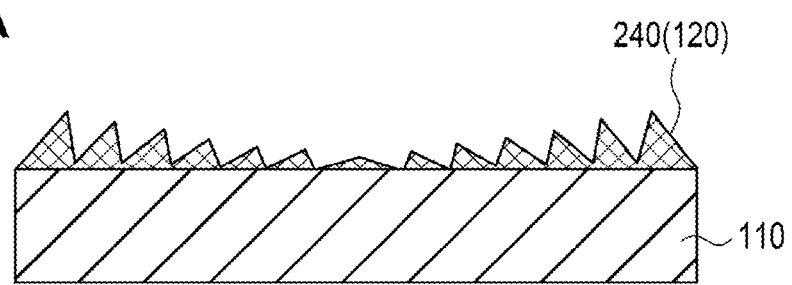
FIG. 9A is a cross-sectional view illustrating an example of unit blocks in which asperities conforming to phase angles are formed (in the absence of a reflective layer).
Figure 9B:
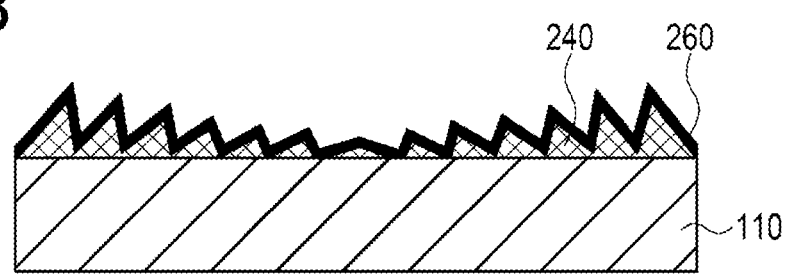
FIG. 9B is a cross-sectional view illustrating an example of unit blocks in which asperities conforming to phase angles are formed (in the presence of a reflective layer).

FIGS. 9A to 9B each show a cross-sectional view of unit blocks 120 in which asperities conforming to phase angles $\phi$ are formed.

When converting each phase angle $\phi$ into an asperity height, the computer calculates the phase angle $\phi$ in the range of $0\pi$ to $2\pi$, and converts the resultant value into an 8-bit grayscale value, for output to the image. In this case, $2\pi$ a corresponds to the level 255 of the 8-bit grayscale value. Then, based on the results of the calculation, an image pattern is drawn on a resist substrate by use of an electron beam drawing device.

If the electron beam drawing device is not compatible with multi-level drawing, the image pattern is drawn in the same portion multiple times with different power outputs to achieve drawing approximate to multi-level drawing. Drawing three times may achieve an expression corresponding to eight-stage multi-level drawing. Then, the photoresist is developed and electroformed.

Using the original plate, asperities are formed, as shown in FIG. 9A, on a phase modulation structure 240 of a thermoplastic resin, a thermosetting resin, a UV resin, or the like provided to a substrate 110. Thus, unit blocks 120 are obtained, in which asperities conforming to the phase angles $\phi$ have been formed. The phase modulation structure 240 may have a thickness in the range of 1 μm or more and 25 μm or less.

If reflected light is to be observed, a reflective layer 260 may be applied, as shown in FIG. 9B, to the surface of the phase modulation structure 240. If transmitted light alone is to be observed without observing reflected light, the reflective layer 260 does not need to be applied, as shown in FIG. 9A, to the surface of the phase modulation structure 240.

A description so far has been given of forming unit blocks 120, with asperities being formed conforming to the phase angles $\phi$, by use of an original plate. As another method, a silver halide exposure material may be exposed and developed, and then bleached, followed by modifying the developed silver into a silver salt, such as silver halide, to make the material transparent. Alternatively, a thermoplastic or the like, whose refractive index or surface configuration changes due to light, may be used.

Figure 10A:
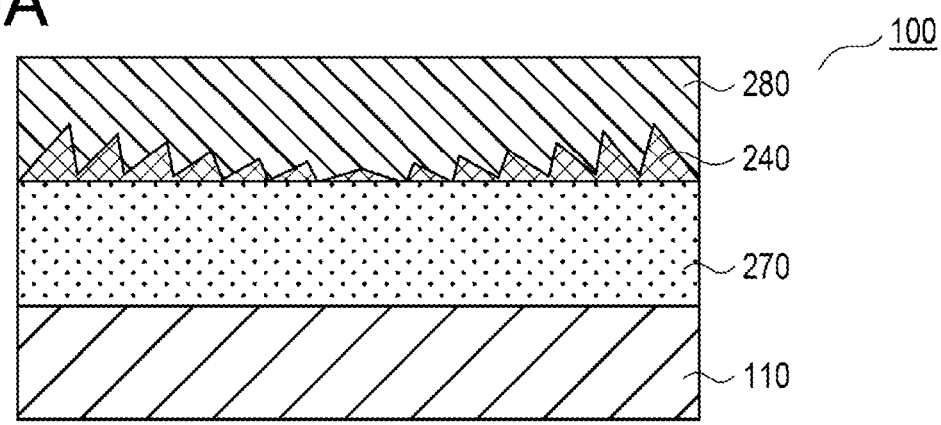
FIG. 10A is a cross-sectional view illustrating an example where a coating of an adhesive layer is applied to unit blocks in which asperities conforming to phase angles are formed (in the absence of a reflective layer).
Figure 10B:
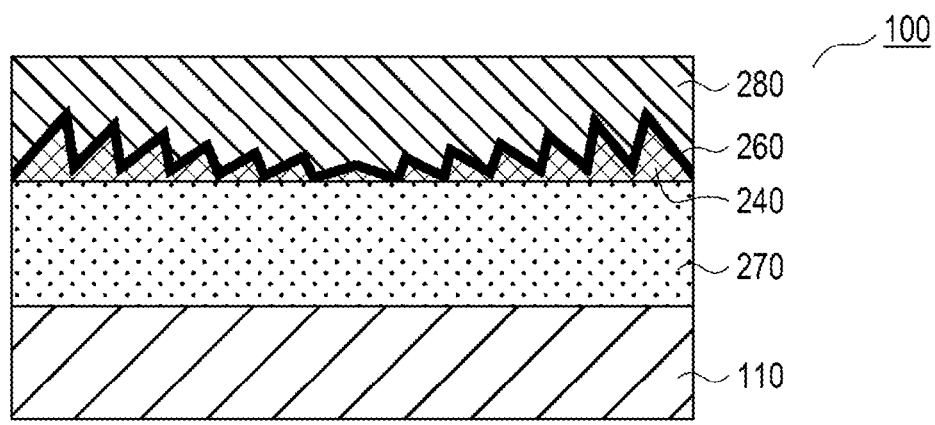
FIG. 10B is a cross-sectional view illustrating an example where a coating of an adhesive layer is applied to unit blocks in which asperities conforming to phase angles are formed (in the presence of a reflective layer).

FIGS. 10A and 10B each show, as applications of the optical films shown in FIGS. 9A and 9B, a cross-sectional view of an optical film 100 configured, as necessary, by laminating a release layer 270 on the substrate 110, further laminating a phase modulation structure 240 on the release layer 270, and further laminating an adhesive layer 280 on the phase modulation structure 240, so as to be bonded to an object (not shown) via the adhesive layer 280.

FIGS. 10A and 10B respectively correspond to FIGS. 9A and 9B. Specifically, FIG. 10A is a cross-sectional view illustrating a configuration of an optical film without application of a reflective layer 260 onto a phase modulation structure 240, and FIG. 10B is a cross-sectional view illustrating a configuration of an optical film 100 with application of a reflective layer 260 onto a phase modulation structure 240.

Figure 11A:
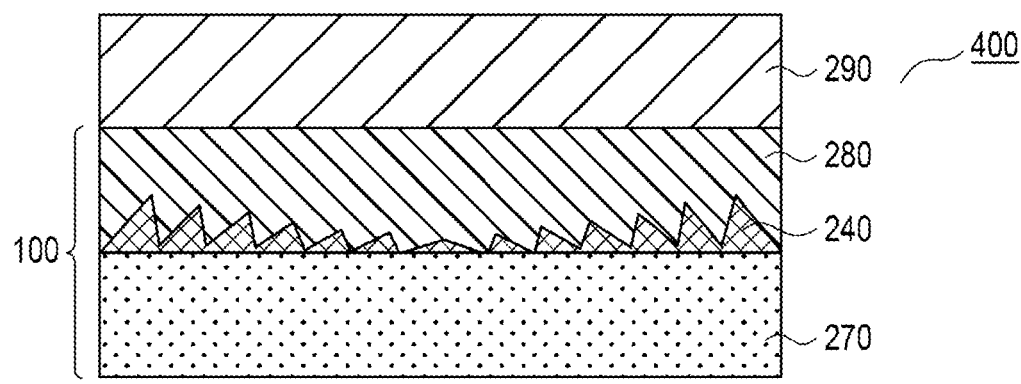
FIG. 11A is a cross-sectional view illustrating an example of a display including unit blocks (transferred to an object) in which asperities conforming to phase angles are formed (in the absence of a reflective layer).
Figure 11B:
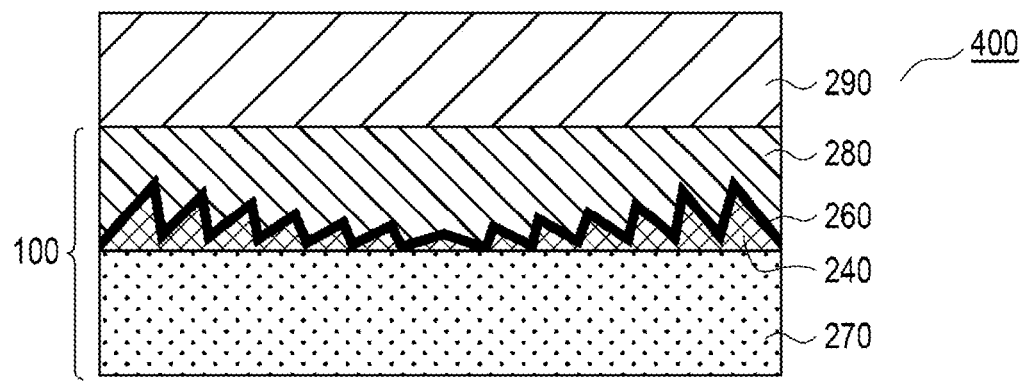
FIG. 11B is a cross-sectional view illustrating an example of a display including unit blocks (transferred to an object) in which asperities conforming to phase angles are formed (in the presence of a reflective layer).

FIGS. 11A and 11B respectively correspond to FIGS. 10A and 10B. Specifically, FIGS. 11A and 11B are cross-sectional views each showing a display body 400 containing the optical film 100 that has been transferred to an object 290 via the adhesive layer 280, followed by releasing the substrate 110 from the release layer 270.

The material used for the substrate 110 may be a rigid material, such as a glass substrate, or may be a film substrate. The material used for the substrate 110 may be a plastic film such as PET (polyethylene terephthalate), PEN (polyethylene naphthalate) and PP (polypropylene). The material used for the substrate 110 may preferably be one that is less likely to be deformed or altered due to heat or pressure applied when a phase modulation structure 240 is provided. Depending on the usage or purpose, paper, synthetic paper, plastic multilayer paper, resin-impregnated paper, or the like may be used as the substrate 110. The substrate 110 may have a thickness in the range of 12 μm or more and 50 μm or less.

The release layer 270 may be made of a resin or a lubricant. The resin may preferably be a thermoplastic resin, a thermosetting resin, an ultraviolet curable resin, or an electron beam curable resin. The resin may be an acrylic resin, a polyester resin, or a polyamide resin. The lubricant may preferably be a wax of polyethylene powder, a paraffin wax, silicone wax, carnauba wax, or the like. These materials may be applied to the substrate 110 by a known coating method, such as gravure printing, or micro gravure printing to form a release layer 270. The release layer 270 may have a thickness in the range of 0.1 μm to 2 μm.

The phase modulation structure 240 may be made of a resin. The resin may preferably be a thermoplastic resin, a thermosetting resin, an ultraviolet curable resin, a thermoformable material having a radically polymerizable unsaturated group, an electron beam curable resin, or the like. Resins that can be used may be thermoplastic resins such as urethane resins, polycarbonate resins, polystyrene resins or polyvinyl chloride resins, unsaturated polyester resins, melamine resins, epoxy resins, urethane (meth)acrylate, polyester (meth)acrylate, epoxy (meth)acrylate, polyol (meth)acrylate, melamine (meth)acrylate, or triazine (meth)acrylate. The phase modulation structure 240 may have a thickness in the range of 0.5 μm to 5 μm.

The reflective layer 260 may be formed of an ink. The ink that can be used may be an offset ink, a letterpress ink, a gravure ink, or other inks, depending on the printing method. Depending on the composition, a resin ink, an oil-based ink, or an aqueous ink may be used. Furthermore, depending on the drying method, the ink may be an oxidative polymerization type ink, a penetration drying type ink, an evaporation drying type ink, or an ultraviolet curable ink.

As a material for the reflective layer 260, a functional ink whose color changes according to the illumination angle or the observation angle may be used. Such a functional ink may be an optically variable ink, a color shift ink, or a pearl ink.

The material for the reflective layer 260 may be an inorganic compound. The inorganic compound may preferably be a metal compound which may be $TiO_2$, $Si_2O_3$, SiO, $Fe_2O_3$ or ZnS. Inorganic compounds have a high refractive index and easily increase reflectance. The material for the reflective layer 260 may be metal. The metal may be Al, Ag, Sn, Cr, Ni, Cu or Au.

A reflective layer 260 of an inorganic material or metal can be formed by vapor-phase deposition. The vapor-phase deposition method may use evaporation, CVD or sputtering.

The reflective layer 260 may have a thickness in the range of 10 nm or more and 500 nm or less. The reflective layer 260 preferably has a reflectance in the range of 30% or more and 70% or less. When the reflectance is 30% or more, sufficient reflection can be achieved even if a base printed layer is provided. If the reflectance is more than 70%, the base printed layer is less likely to be observed. The reflective layer may be a single layer or a multilayer.

The display bodies 400 shown in FIGS. 11A and 11B are each configured by bonding the optical film 100 to the object 290. The object 290 may be a paper currency, coupon, stamp, card, signage, poster, tag, seal, or the like. The adhesive layer 280 only needs to adhere to the object 290, and thus an adhesive or the like of whatever quality is required may be used.

The object 290 may be made of a material, such as paper or polymer, to which the optical film can be bonded via the adhesive layer 280, although it is not particularly limited.

The display body 400 may be provided, on its surface, with a protective layer (not shown) to prevent damage thereof which is easily caused due to friction or the like and may lead to blurring in the reconstructed image. The protective layer may be imparted with hard coating properties which may correspond to a hardness of H or more and 5H or less in a pencil hardness test (JIS K5600-5-4).

The display body 400 may preferably have a surface gloss at 20° (Gs(20°)) in the range of 15 or more and 70 or less. If the surface gloss at 20° (Gs(20°)) is less than 15, non-glare properties become prominent, and the reconstruction points 220 cannot reconstruct a good image. If the surface gloss at 20° (Gs(20°)) exceeds 70, non-glare properties become insufficient, and reflected light may appear in the reconstructed image, making it difficult to reconstruct an image or to observe the reconstructed image. More preferably, the surface gloss at 20° (Gs(20°)) may be in the range of 20 or more and 60 or less.

The phase modulation structure 240 may preferably have a transmitted image clarity defined by (C(0.125)+C(0.5)+C(1.0)+C(2.0)) of 200% or more. Furthermore, the phase modulation structure 240 may have a haze (Hz) in the range of 1.0% or more and 25% or less. Gloss at 20° was measured using a gloss meter (Micro-Tri-Gloss manufactured by BYK-Gardner), based on JIS-K7105-1981. Transmitted image clarity was measured using an image clarity measuring instrument (product name: ICM-1DP, manufactured by Suga Test Instruments Co., Ltd.), based on JIS-K7105-1981.

Light that transmits through the non-glare film can be calculated from a maximum wavelength M and a minimum wavelength m, which are measured by permitting light to pass through a moving optical comb, based on a formula $C=(M-m)/(M+m)\times 100$. As the transmitted image clarity C (%) has a larger value, a clearer and better image is obtained. Since optical combs of four different widths (0.125 mm, 0.5 mm, 1.0 mm and 2.0 mm) were used for the measurement, 100%×4=400% will be the maximum value.

Haze (Hz) was measured using a haze meter (NDH2000 manufactured by NIPPON DENSHOKU INDUSTRIES, CO., LTD.), based on JIS-K7105-1981.

Total luminous reflectance can be measured based on JIS-K7105 using a spectrophotometer, which may be a U-4100 manufactured by Hitachi High-Technologies Corporation, and an integrating sphere.

Figure 12A:
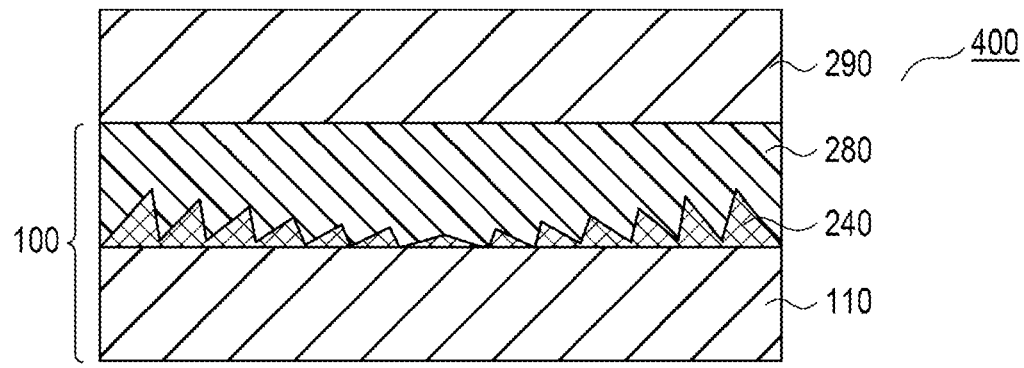
FIG. 12A is a cross-sectional view illustrating an example of a display including unit blocks (transferred to an object together with a substrate) in which asperities conforming to phase angles are formed (in the absence of a reflective layer).
Figure 12B:
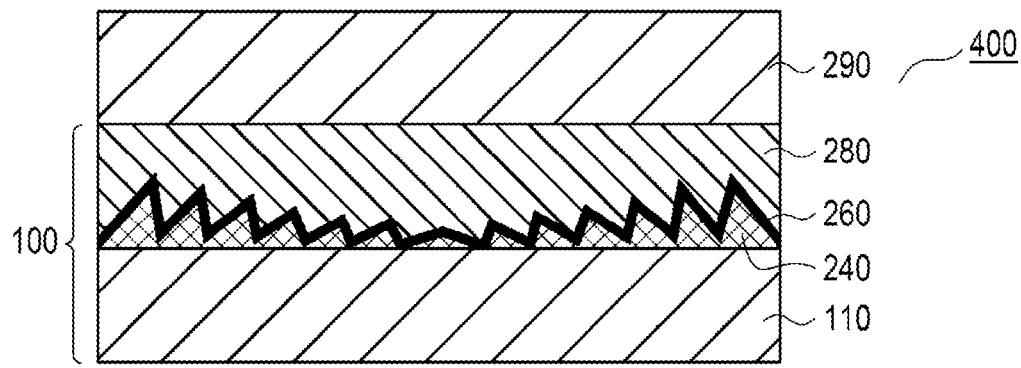
FIG. 12B is a cross-sectional view illustrating an example of a display including unit blocks (transferred to an object together with a substrate) in which asperities conforming to phase angles are formed (in the presence of a reflective layer).

An optical film 100 may be configured by directly laminating a phase modulation structure 240 on a substrate 110 without forming a release layer 270. FIGS. 12A and 12B are cross-sectional views each illustrating a configuration of a display body 400 in which such an optical film 100 is bonded to an object 290. In this case, since there is no release layer 270, as shown in FIGS. 12A and 12B, the substrate 110 remains after bonding of the optical film 100 to the object 290.

As described above, the optical film 100 the present embodiment can convert phase angles ϕ into asperity heights of the unit blocks 120, and can form asperities having heights corresponding to the phase angles ϕ in the unit blocks 120, thereby reproducing an image at the reconstruction points 220. Furthermore, personal authentication information can be shown in this reconstructed image.

Third Embodiment

An optical film according to a third embodiment will be described. In the following description, components having functions identical with or similar to those of the first embodiment are denoted by the same reference signs throughout the drawings to omit duplicate description.

Figure 13:
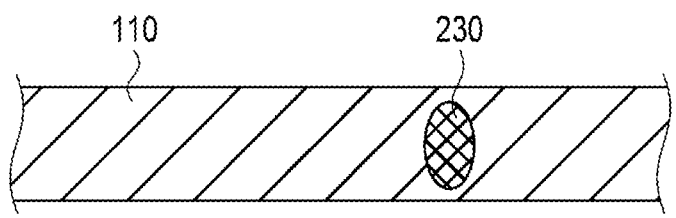
FIG. 13 is a cross-sectional view illustrating an example of a unit block into which a void corresponding to a variation in phase angle is embedded.

As described in the first embodiment, numerical information of corresponding phase angles ϕ is recorded in the unit blocks 120. In an optical film 100 of the present embodiment, the computer converts a variation of each phase angle ϕ into a variation in terms of a refractive index of the recording surface 140, instead of recording numerical information of the phase angle ϕ. Furthermore, the computer converts the variation of refractive index into a void realizing the variation. Then, this void 230 is embedded, as shown in FIG. 13, in the substrate 110 at a site of the corresponding unit block 120 to record the phase angle ϕ in the unit block 120.

As described above, the optical film 100 of the present embodiment can convert variation of each phase angle ϕ into variation in terms of a refractive index of the recording surface 140, and can embed a void 230 for realizing the variation in the substrate 110 at a site of the corresponding unit block 120, thereby reproducing an image at the reconstruction points 220.

Fourth Embodiment

Figure 14A:
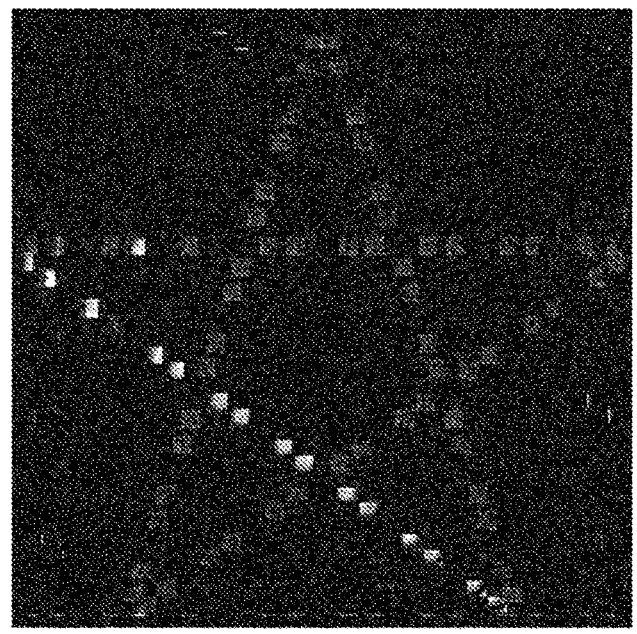
FIG. 14A is an example showing an image reconstructed at reconstruction points (the present embodiment).
Figure 14B:
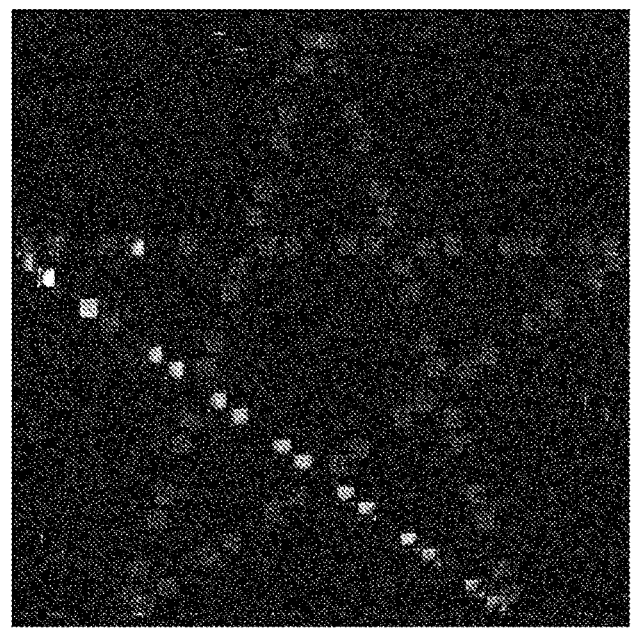
FIG. 14B is an example showing an image reconstructed at reconstruction points (conventional art).

FIGS. 14A and 14B each show an image reconstructed at reconstruction points 220.

FIG. 14A shows an image reconstructed by performing calculation only for unit blocks that are included in a representative area and by copying the results of the calculation to other areas, as described in the first embodiment referring to FIGS. 2A to 2E.

Calculation for obtaining a reconstructed image shown in FIG. 14A will be described referring to FIGS. 15A and 15B.

Figure 15A:
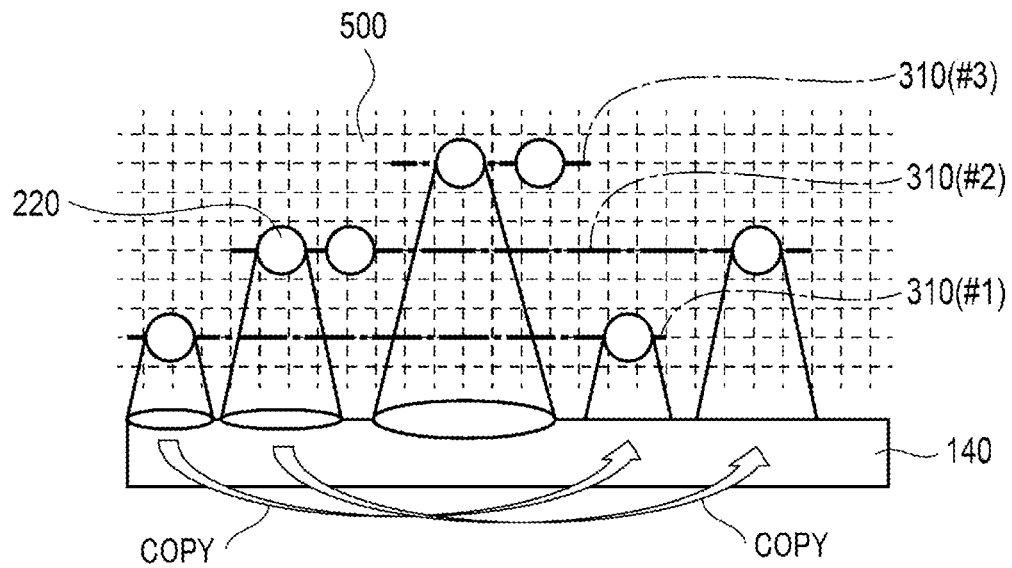
FIG. 15A is a side view illustrating a recording surface with indication of positional relation thereof with a plurality of reconstruction points.
Figure 15B:
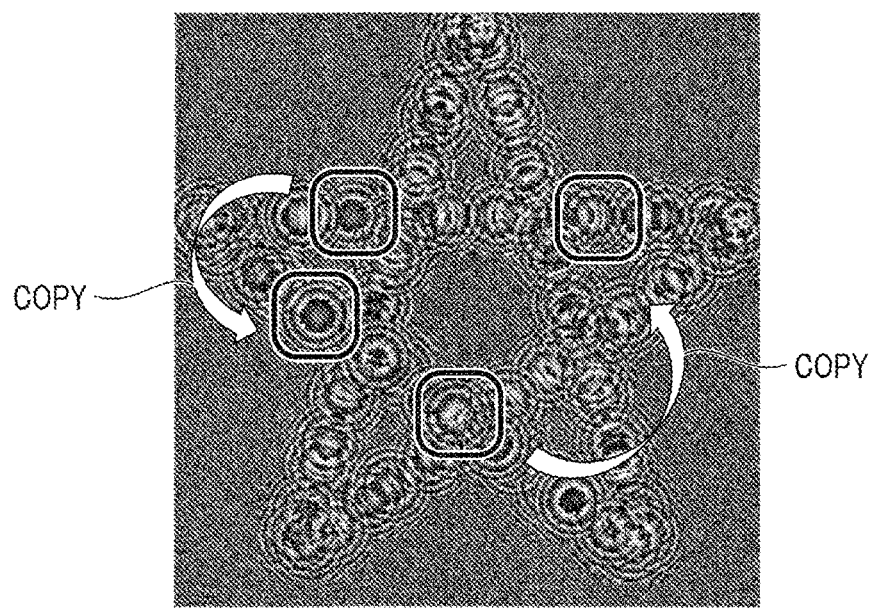
FIG. 15B is an image showing use of data for other reconstruction points in the same layer.

FIG. 15A is a side view illustrating a recording surface 140 with indication of positional relation thereof with a plurality of reconstruction points 220.

The reconstruction points 220 at the same height from the recording surface 140 should have the same diffraction structure. Taking advantage of this fact, already calculated data can be applied to the structures of other reconstruction points 220 at the same height. As shown in FIG. 15A, reconstruction points 220 are grouped based on the distance from the recording surface 140, i.e. grouped for individual reconstruction point layers 310(#1 to #4) so that the reconstruction points 220 at the same height are grouped. For each of the reconstruction point layers 310(#1 to #4), phases are calculated for only one reconstruction point 220. For other reconstruction points 220 in each of the reconstruction point layers 310(#1 to #4), the calculated phases are copied as in FIG. 15B.

Accordingly, phases only have to be calculated by the number of times corresponding to the number of reconstruction point layers 310(#1 to #4), thereby reducing the amount of calculation. Each reconstruction point layer 310(#1-#4) can be arrayed as a quantization grid 500. The reconstruction points 220 can also be arrayed on the quantization grid 500. The quantization grid 500 is used as a reference for arranging reconstruction points and the like. In the quantization grid 500, the recording surface 140 is taken to have x- and y-axes. In the grid 500, a direction perpendicular to the recording surface 140 is taken to be a z-axis, and grid lines parallel to the x-y-z coordinates are disposed at a regular pitch. The pitch in the quantization grid 500 may be an integral multiple of the pitch of the unit blocks 120 arranged on the recording surface 140. Using such a quantization grid 500, values of the x-, y- and z-coordinates of each reconstruction point 220 should be integers, and thus the amount of calculation can be reduced. As data for specifying each reconstruction point 220, bitmap data and voxel data may be used.

The plurality of reconstruction point layers 310 may have an interval therebetween of 0.002 mm or more and 120 mm or less. The number of reconstruction point layers 310 may be one, or two or more and 256 or less. The plurality of reconstruction point layers 310 may have a regular interval or a modulated interval. The interval between the reconstruction point layers 310 may be modulated depending on the density of the reconstruction points 220 or the distance between the reconstruction points 220 and the recording surface 140.

Figure 15C:
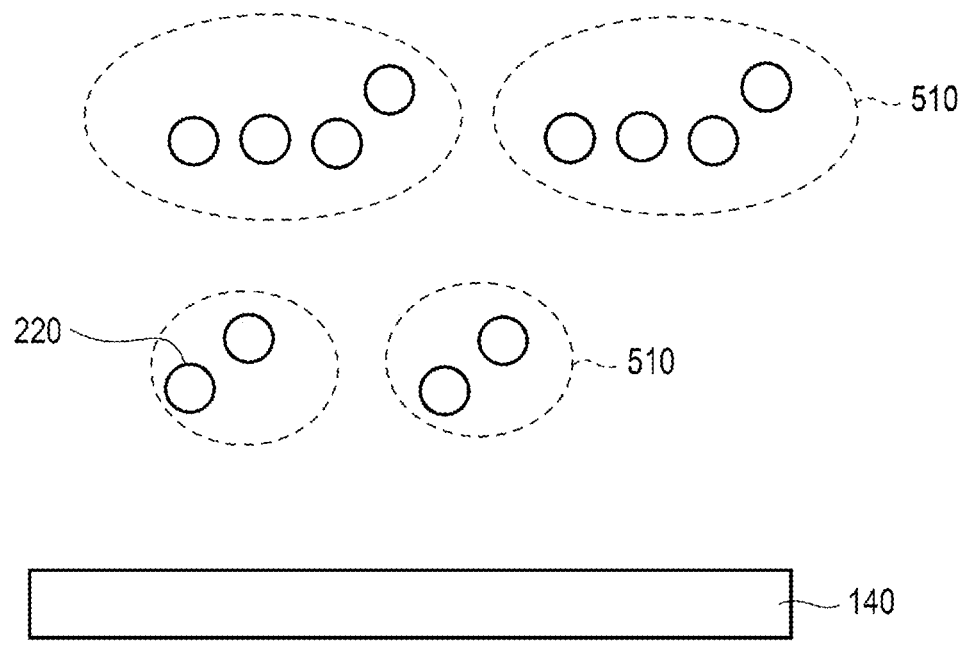
FIG. 15C is a side view illustrating a recording surface with indication of positional relation thereof with a plurality of reconstruction points.

As shown in FIG. 15C, the reconstruction points 220 may be clustered into reconstruction point clusters 510. Between the reconstruction point clusters 510 that are identical in terms of arrangement and distances from the recording surface 140, data of an already calculated reconstruction point cluster 510 may be copied, as in FIG. 15B.

Figure 15D:
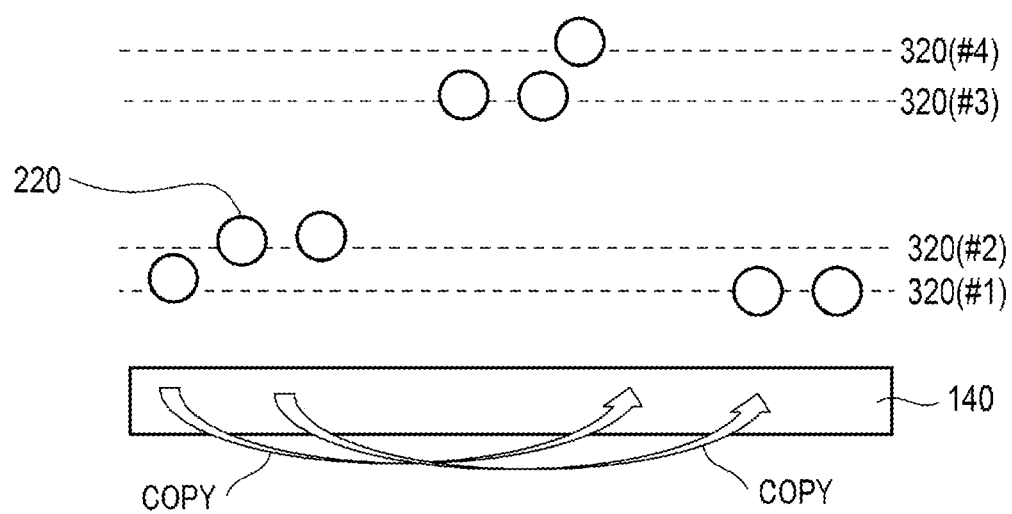
FIG. 15D is a side view illustrating a recording surface with indication of positional relation thereof with a plurality of reconstruction points.

Further, as shown in FIG. 15D, the density of layers 320 may be modulated in conformity with the reconstruction points 220 to reduce the number of layers 320. Specifically, the reconstruction points 220 may be grouped for individual layers 320(#1 to #4) so that the reconstruction points 220 located at the same distance from the recording surface 140 are grouped. For each of the layers 320(#1 to #4), phases may be calculated for only one reconstruction point 220. For other reconstruction points 220 in each of the layers 320(#1 to #4), the calculated phases may be copied as in FIG. 15B. Accordingly, phases only have to be calculated a number of times corresponding to the number of layers 320(#1 to #4), thereby reducing the amount of calculation. The plurality of layers 320 may have an interval therebetween in the range of 2 μm or more and 120 mm or less. The number of 320 may be one, or two or more and 256 or less. The interval between the plurality of layers 320 may be an integral multiple of the pitch of the unit blocks 120 arranged on the recording surface 140. The layers 320 may have a regular interval or a modulated interval. The interval between the layers 320 may be modulated depending on the density of the reconstruction points 220 or the distance between the reconstruction points 220 and the recording surface 140.

FIG. 14B shows a reconstructed image based on the results of calculation performed for all the unit blocks in the calculated element region 160.

Herein, each unit block has a size of 250 nm, wavelength λ of light is 500 nm, the number of pixels XPIXEL in the X direction of the recording surface 140 is 2,500, and the number of pixels YPIXEL in the Y direction of the recording surface 140 is 2,500. The reconstruction points 220 are for reconstructing a star shape as shown in FIG. 16.

Comparing FIGS. 14A and 14B, it is found that there is almost no difference in the results. Accordingly, adequacy has been confirmed in using the method, as described in the first embodiment, of calculating phases for the unit blocks included in the representative area 162 and copying these calculated phases to the unit blocks in the areas 163 to 169.

Figures 16, 17:
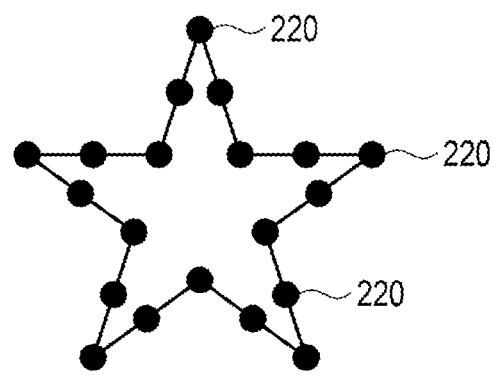
FIG. 16 illustrates reconstruction points for reconstructing a star shape for the reconstructed images of FIGS. 14A and 14B.
FIG. 17 is a table showing the degree of reducing calculation time in an example.

FIG. 17 shows reduction of calculation time as a result of using the method described in the first embodiment, for the calculated element region 160 shown in FIGS. 2A to 2E.

As shown in FIG. 17, it has been confirmed that, according to the present embodiment, the time required for recording data to all the unit blocks 120 in the calculated element region 160 is reduced to ¼=25%, compared to the calculation method based on conventional art. As described above, in FIGS. 2A to 2E, the number of unit blocks subjected to calculation is 15 among 81. Thus, time taken for the task of calculation is reduced to 15/81=18.5%. However, there is a task of copying data to seven copying areas 163 to 169. Taking this copying task into account, time is resultantly reduced to 25% which is larger than 18.5%. Even when the time taken for the copying task is considered, use of the method described in the first embodiment can still greatly reduce the processing time.

Modes for implementing the present disclosure have so far been described with reference to the drawings; however, the present disclosure should not be limited to these configurations. A person skilled in the art may conceive various alterations and modifications within the technical idea recited in the claims. Such alterations and modifications should be construed to be encompassed by the technical scope of the present disclosure.

What is claimed is:

1. A calculation method used for calculating phases of calculated element regions, the calculated element regions each being formed of a plurality of unit blocks for which phases of light are calculated and corresponding to reconstruction points on a one-to-one basis, the method comprising the steps of:

defining a point on each calculated element region as a center thereof by extending a normal line from the corresponding reconstruction point to the calculated element region arranged on a recording surface;

radially dividing the calculated element region into divisions centered on the center of the calculated element region to define one of the divisions as a representative area of the calculated element region;

calculating phases for unit blocks that are partially or entirely included in the representative area;

copying the phases calculated for the unit blocks that are partially or entirely included in the representative area to an area other than the representative area of the calculated element region by rotating the representative area about the center of the calculated element region during inversion of the representative area; and, iterating the rotation and the inversion to calculate phases for all unit blocks in the calculated element region, wherein a phase angle is calculated according to the following formula:

$$W(x, y) = \sum_{n=0}^{Nmax} W_n(kx, ky)$$

$$W_n(kx, ky) = amp_n \cdot \exp(i\phi_n(kx, ky))$$

$$\phi_n(kx, ky) = \frac{\pi}{\lambda \cdot O_n(z)}\{(O_n(x) - kx)^2 + (O_n(y) - ky)^2\}$$

where $W_n(kx, ky)$ is a phase of a reconstruction point n at coordinates (kx, ky, 0) in a calculated element region for an nth reconstruction point, $W(x, y)$ is a phase recorded at coordinates (x, y, 0), n is an nth reconstruction point (n=0 to $N_{max}$), $amp_n$ is an amplitude of light of an nth reconstruction point, i is an imaginary number, $\lambda$ is a wavelength of light when reproducing the reconstruction point, $O_n(x)$ is an x-coordinate of the reconstruction point, $O_n(y)$ is a y-coordinate of the reconstruction point, $O_n(z)$ is a z-coordinate of the reconstruction point, (x, y, 0) is a coordinate of the unit block, and $\phi_n(kx, ky)$ is a phase angle of an nth reconstruction point.

2. The calculation method of claim 1, wherein the reconstruction points are arrayed on a quantization grid.

3. The calculation method of claim 1, wherein:
the calculated element region has a square shape;
lines extending respectively from the corresponding reconstruction point to centers of four sides of the calculated element region form angles that are all θs relative to a line extending from the reconstruction point to the center of the calculated element region; and
these angles are all θs for other reconstruction points.

4. The calculation method of claim 1, wherein:
the calculated element region has a square shape; and
the representative area has a shape of an isosceles right triangle with an oblique line connecting the center of the calculated element region and a vertex of the calculated element region.

5. A recording method, comprising:
recording a phase angle as a retardation on the recording surface of an optical film by using a phase obtained by the calculation method of claim 1, the phase angle being obtained according to $$\phi(x,y) = \arg(W(x,y))$$

wherein $\phi(x, y)$ is a phase angle at coordinates (x, y, 0) and $W(x, y)$ is a phase recorded at coordinates (x, y, 0).

6. A phase modulation structure, comprising:
a recording surface including phase angle recording regions in a plurality of calculated element regions corresponding to reconstruction points of an image on a one-to-one basis, each phase angle recording region being formed of a plurality of unit blocks in each of which a phase angle is recorded, the phase angle being calculated based on a phase that is a sum of a plurality of phases of light from the corresponding reconstruction points; and
a representative area that is one of divisions of the calculated element region, the representative area being obtained by radially dividing the calculated element region centered on a point on the calculated element region, the point being obtained by extending a normal line from the corresponding reconstruction point to the calculated element region on the recording surface, wherein
the representative area produces the calculated element region by being rotated about the center of the calculated element region during inversion of the representative area; and
with the representative area being rotated about the center of the calculated element region during inversion of the representative area, phases of unit blocks partially or entirely included in the representative area are defined in corresponding unit blocks of another calculated element region so as to be the same as the phases of the corresponding unit blocks of the representative area, wherein a phase angle is calculated according to the following formula:

$$W(x, y) = \sum_{n=0}^{Nmax} W_n(kx, ky)$$

$$W_n(kx, ky) = amp_n \cdot \exp(i\phi_n(kx, ky))$$

$$\phi_n(kx, ky) = \frac{\pi}{\lambda \cdot O_n(z)}\{(O_n(x) - kx)^2 + (O_n(y) - ky)^2\}$$

where $W_n(kx, ky)$ is a phase of a reconstruction point n at coordinates (kx, ky, 0) in a calculated element region for an nth reconstruction point, $W(x, y)$ is a phase recorded at coordinates (x, y, 0), n is an nth reconstruction point (n=0 to $N_{max}$), $amp_n$ is an amplitude of light of an nth reconstruction point, i is an imaginary number, $\lambda$ is a wavelength of light when reproducing the reconstruction point, $O_n(x)$ is an x-coordinate of the reconstruction point, $O_n(y)$ is a y-coordinate of the reconstruction point, $O_n(z)$ is a z-coordinate of the reconstruction point, (x, y, 0) is a coordinate of the unit block, and $\phi_n(kx, ky)$ is an nth phase angle.

7. The phase modulation structure of claim 6, wherein the reconstruction points are arrayed on a quantization grid.

8. The phase modulation structure of claim 6, wherein:
the calculated element region has a square shape;
lines extending respectively from the corresponding reconstruction point to centers of four sides of the calculated element region form angles that are all θs relative to a line extending from the reconstruction point to the center of the calculated element region; and
these angles are all θs for other reconstruction points.

9. The phase modulation structure of claim 6, wherein:
the calculated element region has a square shape; and
the representative area among the plurality of unit blocks in the calculated element region has a shape of an isosceles right triangle with an oblique line connecting the center of the calculated element region and a vertex of the calculated element region.

10. An optical film, wherein the phase modulation structure of claim 6 is arranged on the recording surface.

11. The optical film of claim 10, wherein personal authentication information is recorded thereon.

\* \* \* \* \*